United States Patent
Han et al.

(10) Patent No.: US 12,096,276 B2
(45) Date of Patent: Sep. 17, 2024

(54) SYSTEMS AND METHODS FOR DIFFERENTIATION OF SERVICE USING IN-BAND SIGNALING

(71) Applicant: Huawei Technologies Co., Ltd., Shenzhen (CN)

(72) Inventors: Lin Han, San Jose, CA (US); Yingzhen Qu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 17/585,884

(22) Filed: Jan. 27, 2022

(65) Prior Publication Data
US 2022/0150759 A1 May 12, 2022

Related U.S. Application Data

(63) Continuation of application No. PCT/US2020/036826, filed on Jun. 9, 2020.
(Continued)

(51) Int. Cl.
*H04W 28/08* (2023.01)
*H04L 47/52* (2022.01)
(Continued)

(52) U.S. Cl.
CPC ....... *H04W 28/0925* (2020.05); *H04L 47/528* (2013.01); *H04L 47/629* (2013.01);
(Continued)

(58) Field of Classification Search
CPC ......... H04W 28/0925; H04W 28/0263; H04W 28/0289; H04L 47/528; H04L 47/629;
(Continued)

(56) References Cited

U.S. PATENT DOCUMENTS 9,240,950 B2    1/2016  Vedula et al.
9,762,485 B2    9/2017  Kaplan et al.
(Continued)

FOREIGN PATENT DOCUMENTS

CN    101510846 B    4/2011
EP    1521405 A1     4/2005
WO    WO2008085471 A1  7/2008

OTHER PUBLICATIONS

Han, L., et al., "Resource Reservation Protocol for IP Transport QoS," draft-han-tsvwg-ip-transport-qos-00, Jul. 2, 2018, 31 pages.
(Continued)

*Primary Examiner* — Kibrom T Hailu
(74) *Attorney, Agent, or Firm* — Vierra Magen Marcus LLP

(57) ABSTRACT

An apparatus includes a network interface for connection to a network and a database configured to store traffic shaping parameters for a traffic shaping scheme for a plurality of classes of data packets. A database loading circuit is configured to obtain the traffic shaping parameters from in-band communication received in a data packet by the network interface and load the traffic shaping parameters into the database. One or more traffic shapers are configured to access the traffic shaping parameters in the database and apply the traffic shaping scheme according to the traffic shaping parameters to the plurality of classes of data packets received by the network interface.

19 Claims, 9 Drawing Sheets

Related U.S. Application Data

(60) Provisional application No. 62/924,593, filed on Oct. 22, 2019, provisional application No. 63/032,593, filed on May 30, 2020.

(51) Int. Cl.
  *H04L 47/629* (2022.01)
  *H04L 47/6295* (2022.01)
  *H04W 28/02* (2009.01)

(52) U.S. Cl.
  CPC ..... *H04L 47/6295* (2013.01); *H04W 28/0263* (2013.01); *H04W 28/0289* (2013.01)

(58) Field of Classification Search
  CPC ............... H04L 47/6295; H04L 47/623; H04L 47/2408; H04L 47/22
  See application file for complete search history.

(56) References Cited

U.S. PATENT DOCUMENTS

| | | |
|---|---|---|
| 9,906,463 B2 | 2/2018 | Kemmerer et al. |
| 10,225,620 B1 | 3/2019 | Phillips |
| 10,374,944 B2 | 8/2019 | Han |
| 2005/0141510 A1* | 6/2005 | Narsinh ............... H04L 12/4666 370/395.2 |
| 2005/0185651 A1 | 8/2005 | Rinne |
| 2008/0112318 A1 | 5/2008 | Groleau et al. |
| 2010/0008364 A1 | 1/2010 | Andre et al. |
| 2010/0110891 A1 | 5/2010 | Shah et al. |
| 2016/0315819 A1* | 10/2016 | Dara ....................... H04L 41/28 |
| 2018/0270209 A1 | 9/2018 | Arunachalam et al. |

OTHER PUBLICATIONS

International Preliminary Report on Patentability dated Apr. 26, 2022, International Application No. PCT/US2020/036826.

* cited by examiner

SYSTEMS AND METHODS FOR DIFFERENTIATION OF SERVICE USING IN-BAND SIGNALING

CROSS-REFERENCE TO RELATED APPLICATIONS

This application is a continuation of PCT Patent Application No. PCT/US2020/036826, filed Jun. 9, 2020 by Han et al., which claims the benefit of U.S. Provisional Patent Application No. 62/924,593, filed on Oct. 22, 2019 and claims the benefit of U.S. Provisional Patent Application No. 63/032,593, filed on May 30, 2020. The entireties of each of these are incorporated by reference herein.

FIELD

The disclosure generally relates to providing differentiated service in a network.

BACKGROUND

Internet Protocol (IP) is the most widely used technology at layer 3 of the Open System Interconnection (OSI) model for the Internet. At layer 4 of the OSI model, Transmission Control Protocol (TCP) and User Datagram Protocol (UDP) are the most widely used protocols for IP network. The design of the Internet protocols is based on the end-to-end principle. The network infrastructure is considered inherently unreliable at any single network element or transmission medium and is dynamic in terms of availability of links and nodes. No central monitoring or performance measurement facility exists that tracks or maintains the state of the network. For the benefit of reducing network complexity, the intelligence in the network may be located in the end nodes.

BRIEF SUMMARY

According to one aspect of the present disclosure, there is provided an apparatus that includes a network interface for connection to a network and a database configured to store traffic shaping parameters for a traffic shaping scheme for a plurality of classes of data packets received by the network interface. A database loading circuit is configured to obtain the traffic shaping parameters from in-band communication received in a data packet by the network interface and load the traffic shaping parameters into the database. One or more traffic shapers are configured to access the traffic shaping parameters in the database and apply the traffic shaping scheme according to the traffic shaping parameters to the plurality of classes of data packets received by the network interface Optionally, in any of the preceding aspects, the one or more traffic shapers include an egress shaper configured to send data packets of a class to a plurality of queues associated with the plurality of classes of data packets.

Optionally, in any of the preceding aspects, the plurality of queues includes two or more queues managed by a weighted fair queuing scheduler and a priority queue managed by a priority scheduler.

Optionally, in any of the preceding aspects, the one or more traffic shapers include an ingress shaper configured to direct data packets marked for a first class to be re-marked for one or more other classes.

Optionally, in any of the preceding aspects, the traffic shaping scheme is a single rate Three Color Marker (srTCM) scheme directed to the plurality of classes of data packets.

Optionally, in any of the preceding aspects, the traffic shaping scheme is a two rate Three Color Marker (trTCM) scheme.

Optionally, in any of the preceding aspects, the traffic shaping parameters include Committed Information Rate (CIR), Committed Burst Size (CBS), and Exceeded Burst Size (EBS).

Optionally, in any of the preceding aspects, a traffic shaper is configured to re-mark packets marked as belonging to the first class as belonging to a second class or to place packets belonging to the first class in a queue of at least the second class.

Optionally, in any of the preceding aspects, the in-band communication is in a hop-by-hop extension header of an IPv6 data packet.

According to one other aspect of the present disclosure, there is provided a method of operating a networked device that includes receiving a first data packet through a network interface of the networked device, obtaining traffic shaping parameters for a traffic shaping scheme for a plurality of classes of data packets from in-band communication received in the first data packet, and storing the traffic shaping parameters in a database in the networked device. The method further includes, subsequently receiving a plurality of data packets through the network interface of the networked device, identifying corresponding classes for the plurality of data packets, and shaping traffic in the networked device according to identified classes using one or more traffic shapers configured according to the traffic shaping parameters stored in the database.

Optionally, in any of the preceding aspects, shaping traffic in the networked device includes sending data packets of a class to a plurality of queues associated with the plurality of classes of data packets.

Optionally, in any of the preceding aspects, the method further includes selecting data packets from the plurality of queues in a weighted fair queuing scheme and prioritizing data packets of a queue.

Optionally, in any of the preceding aspects, shaping traffic in the networked device includes re-marking packets marked as belonging to a first class as belonging to at least a second class.

Optionally, in any of the preceding aspects, shaping traffic in the networked device according to identified classes using one or more traffic shapers includes applying a single rate Three Color Marker (srTCM) scheme directed to the plurality of classes of data packets.

Optionally, in any of the preceding aspects, shaping traffic in the networked device according to identified classes using one or more traffic shapers includes applying a two rate Three Color Marker (trTCM) scheme directed to the plurality of classes of data packets.

Optionally, in any of the preceding aspects, obtaining the traffic shaping parameters for the traffic shaping scheme includes obtaining Committed Information Rate (CIR), Committed Burst Size (CBS), and Exceeded Burst Size (EBS).

Optionally, in any of the preceding aspects, traffic shaping includes at least one or re-marking packets marked as belonging to a first class as belonging to a second class and placing packets belonging to the first class in a queue of at least the second class.

Optionally, in any of the preceding aspects, obtaining traffic shaping parameters includes reading a hop-by-hop extension header of an IPv6 data packet.

According to still one other aspect of the present disclosure, there is provided a system that includes a plurality of networked devices coupled to a network. Each of the plurality of networked devices includes a network interface for connection to the network. A database is configured to store traffic shaping parameters for a traffic shaping scheme for a plurality of classes of data packets received by the network interface. A database loading circuit is configured to obtain the traffic shaping parameters from in-band communication received in a data packet by the network interface. One or more traffic shapers configured to access the traffic shaping parameters in the database and apply the traffic shaping scheme according to the traffic shaping parameters to the plurality of classes of data packets received by the network interface.

Optionally, in any of the preceding aspects, the one or more traffic shapers include an egress shaper configured to send data packets of a class to a plurality of queues associated with the plurality of classes of data packets.

Optionally, in any of the preceding aspects, the plurality of queues includes two or more queues managed by a Weighted Round Robin (WRR) scheduler and a priority queue managed by a priority scheduler.

Optionally, in any of the preceding aspects, the one or more traffic shapers include an ingress shaper configured to direct data packets marked for a first class to be re-marked for one or more other classes.

Optionally, in any of the preceding aspects, the traffic shaping scheme is a single rate Three Color Marker (srTCM) scheme directed to the plurality of classes of data packets.

Optionally, in any of the preceding aspects, the traffic shaping scheme is a two rate Three Color Marker (trTCM) scheme.

Optionally, in any of the preceding aspects, the traffic shaping parameters include Committed Information Rate (CIR), Committed Burst Size (CBS), and Exceeded Burst Size (EBS).

Optionally, in any of the preceding aspects, a traffic shaper is configured to re-mark packets marked as belonging to the first class as belonging to a second class or to place packets belonging to the first class in a queue of at least the second class.

Optionally, in any of the preceding aspects, wherein the in-band communication is in a hop-by-hop extension header of an IPv6 data packet.

According to still one other aspect of the present disclosure, there is provided a method that includes obtaining traffic shaping parameters for a plurality of data packet classes from in-band signaling received at a networked device and receiving a plurality of data packets at the networked device. The method further includes identifying a corresponding class for each of the plurality of data packets and shaping the plurality of data packets according to the traffic shaping parameters for the plurality of data packet classes such that data packets of at least a first class are divided between a queue for the first class and a queue for a second class.

According to still one other aspect of the present disclosure, there is provided method of operating a networked device that includes receiving a first IPv6 data packet through a network interface of the networked device, obtaining traffic shaping parameters for a traffic shaping scheme for a plurality of classes of data packets from the hop-by-hop extension header of the first IPv6 data packet, and storing the traffic shaping parameters in a database in the networked device. The method further includes subsequently receiving a plurality of IPv6 data packets through the network interface of the networked device, identifying corresponding classes for the plurality of IPv6 data packets from Differentiated Services Code Point (DSCP) fields in headers of the plurality of IPv6 data packets, and shaping traffic in the networked device according to identified classes using one or more traffic shapers configured according to the traffic shaping parameters stored in the database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures (FIGS.) for which like references indicate elements.

DETAILED DESCRIPTION

Figure 1:
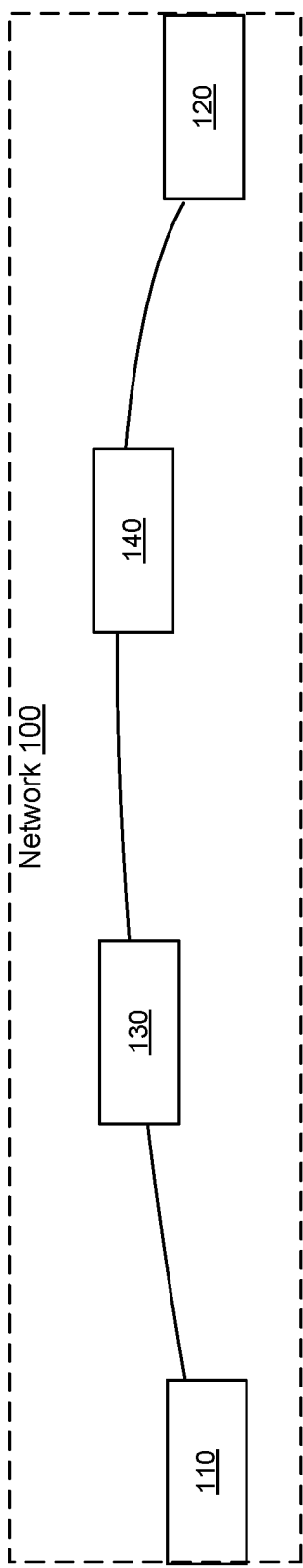
FIG. 1 is a schematic diagram of a network according to an embodiment of the disclosure.

The present disclosure will now be described with reference to the figures (FIGS.), which in general relate to networks, networked devices in networks, and their configuration and operation.

In some networks, different data packets may have different QoS requirements. Data packets may be divided into different classes, with each class having corresponding QoS requirements. In some cases, networked devices may be configured to provide differentiated service for such data packets by individual configuration of each network device along a data path. For example, network devices may be individually loaded with appropriate software or firmware that supports differentiated service and may be configured by configuration commands from an administrator (e.g. through configuration commands from an administrator device that are directed to the individual device for configuration). However, such individual configuration may not be ideal. According to an example of the present technology, in-band communication is used to efficiently configure networked devices in a network to provide end-to-end differentiated services in a network in a manner that does not require individual configuration. The term "in-band communication" or "in-band signaling" generally refers to sending or receiving management traffic through a network like regular network traffic (e.g. sending management traffic in data packets that travel along the same data pathways including the same ports as regular network traffic). This is in contrast to out-of-band communication that may use a dedicated communication channel for management traffic that is separate from normal network traffic. Such in-band communication may be provided in extension headers of IPv6 packets, which are received by networked devices (e.g. by multiple routers along a data path). Configuration information (e.g. traffic shaping parameters to be applied by routers) obtained from in-band communication may be loaded into databases in networked devices and may be used to configure traffic shapers to shape data traffic as required. In-band communication may also indicate when networked devices can or cannot comply with class-based QoS requirements. Traffic shaping implemented by a networked device may identify a class associated with a data packet by reading header information and may then apply traffic shaping as indicated by traffic shaping parameters that were previously loaded into a database in the router (e.g. obtained from in-band communication and loaded into the database). Different flows may be mapped to a class and the QoS requirements of the class (and corresponding traffic shaping parameters) may be determined for the class based on combining QoS requirements for the flows of the class.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 is a schematic diagram of a network 100 according to an embodiment of the disclosure. The network 100 includes devices 110 and 120 and routers 130 and 140 coupling the device 110 with the device 120. The device 110 and the device 120 may send Internet Protocol (e.g. Internet Protocol version 6, or IPv6) packets to each other via the routers 130 and 140 (while the example of an IPv6 packet is used in the present document, it will be understood that the present technology is not limited to any particular protocol). In some embodiments, the network 100 includes more routers between the device 110 and the device 120. However, in the interest of brevity, only two routers are shown in FIG. 1. The devices 110 and 120 may be personal computers, servers, routers, smartphones, laptops, etc. Devices 110 and 120 may be edge devices of network 100 and may act as ingress and egress modules of network 100. Devices 110 and 120, routers 130 and 140 and similar devices that exchange data packets over a network may be considered networked devices.

Figure 2:
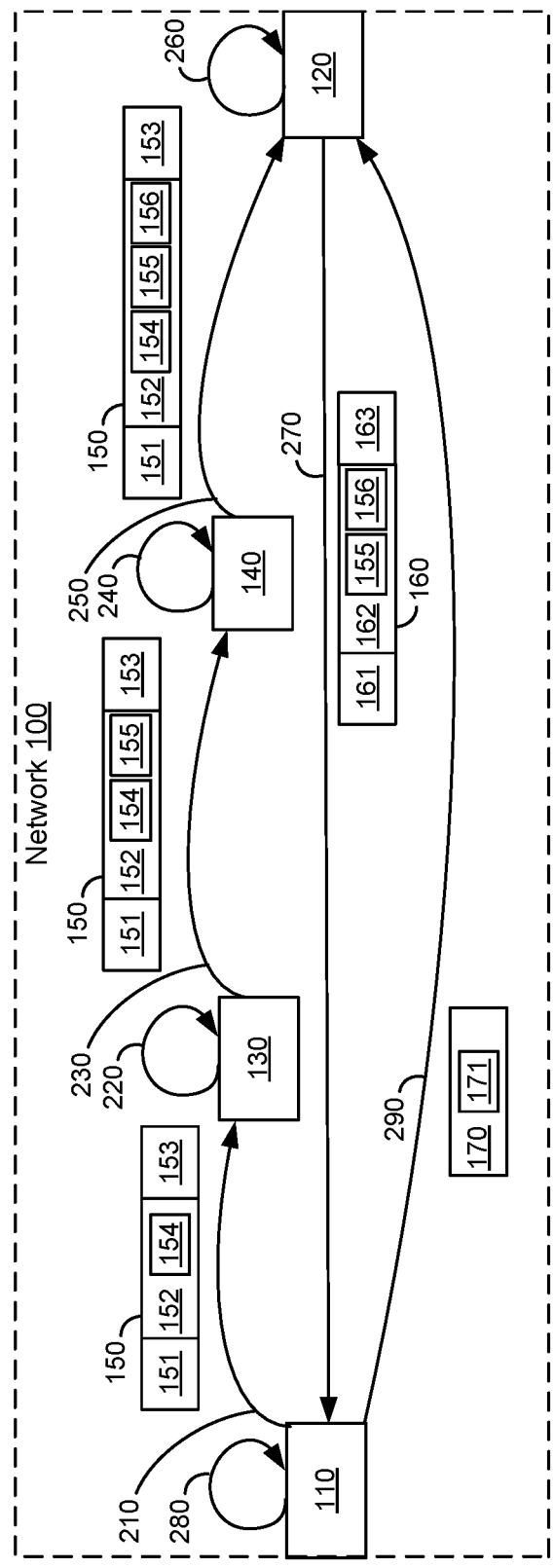
FIG. 2 illustrates a method of establishing a connection with differentiated service according to an embodiment of the disclosure.

FIG. 2 illustrates a method of establishing a connection based on the network 100 using in-band signaling according to an embodiment of the disclosure.

At operation 210, the device 110 sends a first IPv6 packet 150 including a Transfer Control Protocol (TCP) Synchronize (SYN) segment 151 to the router 130. The first IPv6 packet 150 is used to establish a connection from the device 110 to the device 120 and the destination IPv6 address of the first IPv6 packet is the IPv6 address of the device 120. A connection may be determined based on some information in IPv6 packets. In one example, when packets have a same source IP address and a same destination IP address and further have a same source port, and a same destination port and a protocol number, these packets are considered as belonging to a same connection. A connection may be referred to as a path. The first IPv6 packet 150 further includes a hop-by-hop extension header 152. The hop-by-hop extension header 152 may be between an IPv6 header 153 and the TCP SYN segment 151 and carry one or more class based QoS requirements 154 for an upstream connection.

In some examples, data packets may be divided into different classes and QoS requirements may include class based QoS requirements for one or more of the classes used so that differentiation of service information is conveyed in such headers. Class based QoS requirements may include traffic shaping parameters used for traffic shaping according to the different service levels required. The upstream connection refers to a connection from the device 110 to the device 120. In some embodiments, when an IPv6 packet carrying a hop-by-hop extension header is received by a plurality of routers between a source node and a destination node, each of the routers will examine the hop-by-hop extension header (e.g. parsing the IPv6 packet and reading values from the hop-by-hop extension header). For example, the contents of the hop-by-hop extension header will be read by the routers and some actions may be performed according to instructions carried in the hop-by-hop extension header. For example, some information may be added or updated to the hop-by-hop extension header. The source node and the destination node of the IPv6 packet may also examine the hop-by-hop extension header. In some examples, a networked device may perform some configuration according to information provided in a hop-by-hop extension header in order to meet one or more class based QoS requirements. For example, a networked device may perform internal configuration of a traffic shaper according to received traffic shaping parameters to ensure that each class of data packets is appropriately handled to ensure the required QoS.

An example of a hop-by-hop extension header may be the Hop-by-Hop Options Header defined in RFC 2460, which is incorporated by reference herein in its entirety. According to RFC 2460, any IPv6 packet including the Hop-by-Hop Options Header needs to be examined by each router receiving the IPv6 packet, such as all routers on the connection, the device 110 and the device 120. Particularly, Hop-by-Hop Options Header is used to carry optional information that must be examined by every node along a packet's delivery path. The Hop-by-Hop Options header is identified by a Next Header value of 0 in the IPv6 header and has the format shown in Table 1.

TABLE 1

| Next Header | Hdr Ext Len | Options |
| --- | --- | --- |

Next Header of the hop-by-hop extension header shown in Table 1 is an 8-bit selector which identifies the type of header immediately following the Hop-by-Hop Options header. Next Header may use the same values as the IPv4 Protocol field [RFC-1700 et seq.]. Hdr Ext Len is an 8-bit unsigned integer. It indicates the length of the Hop-by-Hop Options header in 8-octet units, not including the first 8 octets. Options is a variable-length field such that the complete Hop-by-Hop Options header is an integer multiple of 8 octets long. Options contains one or more TLV-encoded options.

Besides the Hop-by-Hop Options Header defined in RFC 2460, some other examples of the hop-by-hop extension header may be further defined.

The class based QoS requirements 154 include values of some parameters of the upstream connection. The parameters may include information associated with the QoS of the upstream connection for two or more data packet classes. QoS parameters may relate to bandwidth and latency specified for a class. In one example, the bandwidth may refer to a scope between a low bandwidth value and a high bandwidth value. The class based QoS requirements 154 may indicate that the first IPv6 packet is used to establish an upstream connection with QoS assurance for each class specified. For example, the bandwidth of the upstream connection with QoS assurance for a first class of data packets is no less than a value included in class based QoS requirements, such as 5 Mb/s and the latency of the upstream connection with QoS assurance for a second class of data packets is no less than another value included in class based QoS requirements.

At operation 220, the router 130 receives the first IPv6 packet 150 and obtains the class based QoS requirements 154 in the hop-by-hop extension header 152. The router 130 determines whether its capability of forwarding data packets of the upstream connection meets (or can be configured to meet) the class based QoS requirements 154 for the classes specified and may perform appropriate configuration accordingly to ensure QoS requirements are met for each class. If the capability meets the class based QoS requirements 154, the router 130 programs its hardware (e.g. using traffic shaping parameters in class based QoS requirements 154) so that the router 130 will forward the data packets of the upstream connection based on the class based QoS requirements 154 for different classes (e.g. prioritizing data packets in a class that has low latency requirement). The router 130 may further modify the first IPv6 packet 150 by setting the hop-by-hop extension header 152 to indicate that the router 130 meets (is configured to meet) the class based QoS requirements for the specified classes. For example, the router 130 may update a first setup state 155 in the hop-by-hop extension header 152 to indicate that the router 130 meets the class based QoS requirement, where the setup state 155 is in a first setup state field in the hop-by-hop extension header 152. If the router 130 may not meet the class based QoS requirements, the router 130 may modify the first IPv6 packet 150 by setting the hop-by-hop extension header 152 to indicate that the router 130 does not meet the class based QoS requirements. For example, the router 130 may update the first setup state 155 in the hop-by-hop extension header 152 to indicate that the router 130 does not meet the class based QoS requirements.

The first setup state field may also include extra information of the QoS programming state depending on the QoS implementation method. The extra information may include a finite size of data (mapping index) used as the reference to the QoS programming database. By using the reference, the IP forwarding process or hardware can quickly retrieve more details of the QoS programming state such as classification ID, scheduler ID, queue ID, etc. to speed up the IP forwarding with the guaranteed quality.

At operation 230, the router 130 sends the modified first IPv6 packet 150 to the router 140 according to the destination IP address of the first IPv6 packet 150.

At operation 240, the router 140 receives the first IPv6 packet 150 from the router 130 and obtains the class based QoS requirements 154 in the hop-by-hop extension header 152. Similar to the router 130, the router 140 determines whether its capability of forwarding data packets of the upstream connection meets the class based QoS requirements 154 for the classes indicated. If the capability of router 140 meets the class based QoS requirements 154, the router 140 programs its hardware according to the class based QoS requirements (e.g. configuring traffic shaping according to traffic shaping parameters) so that the router 140 will forward the data packets of the upstream connection based on the class based QoS requirements 154 for different classes (e.g. prioritizing data packets in a class that has low latency requirement). The router 140 may further modify the first IPv6 packet 150 by setting the hop-by-hop extension header of the first IPv6 packet to indicate that the router 140 meets (is configured to meet) the first QoS requirement. For example, the router 140 may update a second setup state 156 in the hop-by-hop extension header to indicate that the router 140 meets the class based QoS requirements, where the second setup state 156 is in a second setup state field in the hop-by-hop extension header. If the router 140 may not meet the class based QoS requirements 154, the router 140 may modify the first IPv6 packet 150 by setting the hop-by-hop extension header 152 to indicate that the router 140 does not meet the class based QoS requirements. For example, the router 140 may update the setup state in the hop-by-hop extension header 152 to indicate that the router 140 does not meet the class based QoS requirements 154. In some embodiments, the first setup state field and the second setup state field are two different fields in the hop-by-hop extension header. In some embodiments, the first setup state field and the second setup state field refer to one same field including two or more setup states in the hop-by-hop extension header.

At operation 250, the router 140 sends the first IPv6 packet modified by the router 140 to the device 120 according to the destination IP address of the first IPv6 packet.

At operation 260, the device 120 receives the first IPv6 packet 150 from the router 140 and determines that each router on the upstream connection is configured to meet the class based QoS requirements 154 for the classes specified in the hop-by-hop extension header 152.

At operation 270, the device 120 sends a second IPv6 packet 160 including a TCP (Synchronize-Acknowledge) SYN-ACK segment 161 to the device 110, where the destination IP address of the second IPv6 packet is the IP address of the device 110. The second IPv6 packet further includes a destination extension header 162 carrying information indicating that each router on the upstream connection meets the class based QoS requirements 154 for the specified classes. In one example, the information may include the first setup state 155 and the second setup state 156. The destination extension header 162 may be between the TCP SYN-ACK segment 161 and an IPv6 header 163. In some embodiments, the destination extension header 162 may be considered as a portion of the IPv6 header 163. In some embodiments, a destination extension header in an IPv6 packet needs to be examined by destination node(s) only. An example of the destination extension header may be the Destination Options Header defined by RFC 2460. The Destination Options header is used to carry optional information that needs to be examined only by a packet's destination node(s). The Destination Options header is identified by a Next Header value of 60 in the immediately preceding header and may have the same format as shown in Table 1, including "Next Header" "Hdr Ext Len" and "Options" fields.

Next Header of the Destination Options header is an 8-bit selector, which identifies the type of header immediately following the Destination Options header. It uses the same values as the IPv4 Protocol field [RFC-1700 et seq.]. Hdr Ext Len is an 8-bit unsigned integer. It indicates the length of the Destination Options header in 8-octet units, not including the first 8 octets. Options is a variable-length field such that the complete Destination Options header is an integer multiple of 8 octets long. Options contains one or more TLV-encoded options.

At operation 280, the device 110 receives the second IPv6 packet 160 and obtains information indicating that each router on the upstream connection meets the class based QoS requirements 154 from the destination extension header 162. Based on the information indicating that each router on the upstream connection meets the class based QoS requirements 154 for the specified classes, the device 110 determines that the upstream connection meets the class based QoS requirements 154 for the specified classes.

At operation 290, in order to finish the 3-way handshake defined by TCP, the device 110 further sends a third IPv6 packet 170 including a TCP Acknowledge (ACK) 171 to the device 120. Then the upstream connection with QoS assurance is established.

Figure 3:
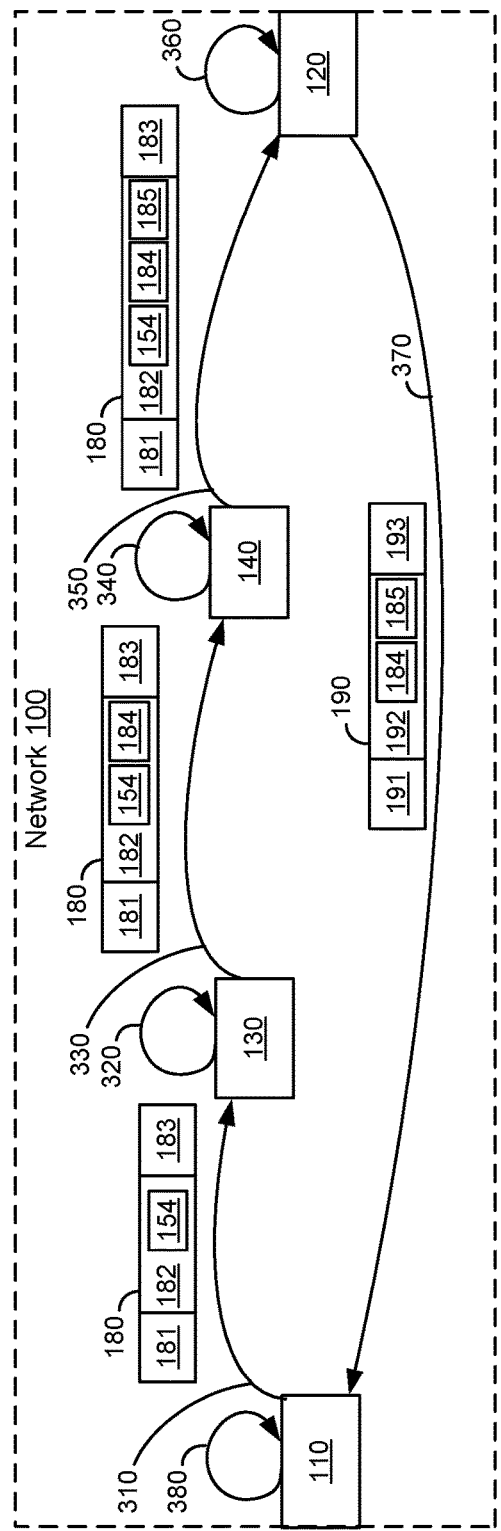
FIG. 3 illustrates a method of checking the state of a connection with differentiated service according to an embodiment of the disclosure.

FIG. 3 illustrates a method of checking the state of a connection with differentiated QoS assurance during data communication using in-band signaling according to an embodiment of the disclosure. For example, the method of FIG. 3 may be used to check an upstream connection established with end-to-end class based QoS requirements as illustrated in FIG. 2.

At operation 310, the device 110 may send IPv6 data packets of an upstream connection, e.g. the connection established according to the operations 210-290, to the device 140 after the upstream connection is established. Similar to the first IPv6 packet 150, some or each of the IPv6 data packets include a hop-by-hop extension header. An IPv6 data packet 180 of the IPv6 data packets sent by the device 110 includes data payload 181, a hop-by-hop extension header 182 carrying the class based QoS requirements 154 and an IPv6 header 183. The hop-by-hop extension header 182 may be the Hop-by-Hop Options Header defined in RFC 2460. The data payload 181 may be a TCP data segment including video and audio, for example.

At operation 320, the router 130 receives the IPv6 data packet 180 of the IPv6 data packets and determines whether the router 130 meets the class based QoS requirements 154 (e.g. latency and/or bandwidth requirements for different classes, for example, implemented by a traffic shaping scheme). When the router 130 meets the class based QoS requirements 154, a first forwarding state 184 is set, e.g. updated, by the router 130 to indicate that the router 130 meets the class based QoS requirements 154. When the router 130 does not meet the class based QoS requirements 154, the first forwarding state 184 is set, e.g. updated, by the router 130 to indicate that the router 130 does not meet the class based QoS requirements 154.

At operation 330, the router 130 sends the modified IPv6 data packet 180 to the router 140. When the router 130 meets the class based QoS requirements 154, the router 130 sends the modified IPv6 data packet 180 to the router 140 based on the class based QoS requirements 154 (with QoS assurance). When the router 130 does not meet the class based QoS requirements 154, the router 130 sends the modified IPv6 data packet 180 to the router 140 without QoS assurance. In some embodiments, the router 130 may even stop sending the modified IPv6 data packet 180 to the router 140 when the router 130 does not meet the class based QoS requirements 154.

At operation 340, the router 140 receives the IPv6 data packet 180 of the upstream connection from the router 130, the router 140 determines whether the router 140 meets the class based QoS requirements 154. Furthermore, the router 140 modifies the IPv6 data packet 180 by setting a second forwarding state 185 in the hop-by-hop extension header 182. An example of the hop-by-hop extension header 182 may be the Hop-by-Hop Option Header defined by RFC 2460. When the router 140 meets the class based QoS requirements 154, the second forwarding state 185 indicates that the router 140 meets the class based QoS requirements 154. When the router 140 does not meet the class based QoS requirements 154, the second forwarding state 185 indicates that the router 140 does not meet the class based QoS requirements 154

At operation 350, the router 140 sends the IPv6 data packet 180 modified by the router 140 to the device 120. When the router 140 meets the class based QoS requirements 154, the router 140 sends the modified IPv6 data packet 180 to the device 120 based on the class based QoS requirements 154 (with QoS assurance). When the router 140 does not meet the class based QoS requirements 154, the router 140 sends the modified IPv6 data packet 180 to the device 120 without QoS assurance.

At operation 360, the device 120 receives the IPv6 data packet 180 from the router 140 and obtains the first forwarding state 184 and the second forwarding state 185 from the hop-by-hop extension header 182.

At operation 370, the device 120 sends an IPv6 packet 190 including a TCP ACK 191 to the device 110, where the IPv6 packet 190 includes the first forwarding state 184 and the second forwarding state 185 in the Destination extension header 192 between the TCP ACK 191 and an IPv6 header 193. The IPv6 packet 190 may be sent via the router 140 and the router 130 to the device 110 or via other routers. The other routers may include only one of the routers 130 and 140 or include none of the routers 130 and 140.

At operation 380, the device 110 receives the IPv6 packet 190 including the TCP ACK 191 and obtains the first forwarding state 184 and the second forwarding state 185 from the Destination extension header 192. Consequently, the device 110 determines whether the upstream connection meets the class based QoS requirements 154. If the upstream connection meets the class based QoS requirements 154, the device 110 may continue the upstream connection with QoS assurance (e.g. including end-to-end differentiation of service). If the upstream connection does not meet the class based QoS requirements 154, the device 110 may stop the upstream connection or continue the upstream connection without the expectation that the upstream connection meets the class based QoS requirements 154.

In some embodiments, the IPv6 packet 150 does not have a TCP SYN 151, but has a UDP segment. The UDP segment encapsulates information set by the application layer (layer 7) of the Open Systems Interconnection (OSI) model. The information is used to request establishing an upstream connection from device 110 to the device 120. After the device 120 receives the IPv6 packet 150, the application layer of the device 120 will obtain the information and consequently send the IPv6 packet 160 to further the establishment of the upstream connection. For the IPv6 packet 160, the TCP SYN-ACK 161 is replaced by a UDP segment including information set by the application layer, where information is used for the establishment of the upstream connection. After the upstream connection is established, the data payload 181 in IPv6 data packet 180 may be a UDP data segment. Furthermore, for the IPv6 packet 190, the TCP ACK 191 is replaced by a UDP segment.

Figure 4:
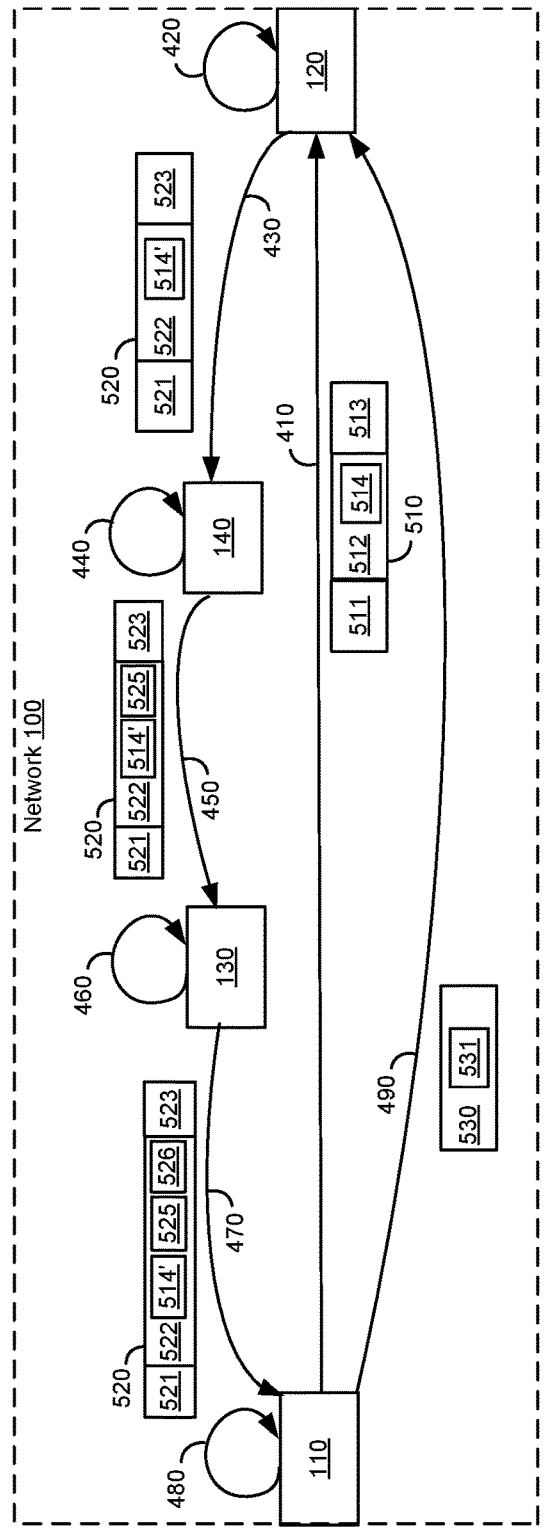
FIG. 4 illustrates a method for establishing a connection with differentiated service according to an embodiment of the disclosure.

FIG. 4 illustrates a method for establishing a connection with end-to-end class based QoS assurance using in-band signaling. While the example of FIG. 2 was generally directed to end-to-end class based QoS for upstream communication from device 110 to device 120, the example of FIG. 4 is generally directed to end-to-end class based QoS for downstream communication from device 120 to device 110.

At operation 410, the device 110 sends an IPv6 packet 510 including a TCP SYN 511 to the device 120. The destination IPv6 address of the first IPv6 packet is the IPv6 address of the device 120. The IPv6 packet 510 further includes a destination extension header 512 and an IPv6 header 513. The destination extension header 512 includes downstream class based QoS requirements 514 for a connection from the device 120 to the device 110. By the standard definition, the Destination extension header 512 only needs to be examined by the destination node(s) of the IPv6 packet. In this embodiment, the Destination extension header 512 only needs to be examined by the device 120. Therefore, the intermediate nodes, such as the router 130 and the router 140, will not change or delete the class based QoS requirements 514 included in the Destination extension header. The class based QoS requirements 514 includes values of some parameters of the downstream QoS path. The parameters may include information associated with the QoS of the downstream path, such as one or more of the bandwidth, burst and latency.

At operation 420, the device 120 receives the IPv6 packet 510, the device 120 obtains the class based QoS requirements 514 for the downstream connection, which may include different QoS requirements for different classes of data packets.

At operation 430, the device 120 sends an IPv6 packet 520 including a TCP SYN-ACK segment 521 to the device 110. The destination IP address of the IPv6 packet 520 is an IPv6 address of the device 110. The IPv6 packet 520 further includes a hop-by-hop extension header 522, such as the Hop-by-Hop Options Header defined by RFC 2460 and an IPv6 header 523. By the standard definition, the hop-by-hop extension header 522 needs to be examined by each router and device which forwards the IPv6 packet. The hop-by-hop extension header 522 includes a class based QoS requirements 514' for the downstream connection. The class based QoS requirements 514' is a requirement determined by device 120 based on the class based QoS requirements 514 and the situation of network resource. For example, it may be exactly the same as the class based QoS requirements 514 or may be substantially the same as or close to class based QoS requirements 514.

At operation 440, the router 140 receives the IPv6 packet 520 and determines whether router 140 meets the class based QoS requirements 514'. For example, the router 140 determines whether it may be programmed to a state meeting the class based QoS requirements 514' in the hop-by-hop extension header 522 for each of the classes of data packet indicated. When the router 140 may be programmed to the state meeting the class based QoS requirements 514', the router 140 will program some hardware according to the class based QoS requirements 514' and store the mapping between a QoS programming state and the downstream connection. The router 140 may modify the IPv6 packet 520 by setting a setup state 525 in the hop-by-hop extension header 522 to indicate that the router 140 has been programmed to meet the class based QoS requirements 514'. Setting the setup state 525 may refer to updating the setup state 525 already existing in the hop-by-hop extension header 522 or adding the setup state 525 into the hop-by-hop extension header 522. In some embodiments, the setup state 525 may be in a first setup state field in the hop-by-hop extension header 522. When the router 140 may not be programmed to the state meeting the class based QoS requirements 514' or the programming was failed, the router 140 will set the setup state 525 in the hop-by-hop extension header 522 to indicate that the router 140 has not been programmed to meet the class based QoS requirements. When the router 140 is programmed to the state meeting the class based QoS requirements 514', the setup state 525 may also include first forwarding information. The first forwarding information may include a finite size of data (mapping index) used as the reference to the QoS programming database. By using the forwarding information in the IP data forwarding process by router 140, router 140 can quickly retrieve more details of the QoS programming state such as classification ID, scheduler ID, queue ID, etc. to speed up the IP forwarding, e.g. forwarding IPv6 data packets of the connection) with the guaranteed quality.

At operation 450, the router 140 sends the modified IPv6 packet 520 to the router 130.

At operation 460, the router 130 receives the IPv6 packet 520 from the router 130 and determines whether the router 130 may meet (be configured or programmed to a state meeting) the class based QoS requirements 514' in the hop-by-hop extension header 522 for the classes of data packets specified. When the router 130 may be configured to meet the class based QoS requirements 514', the router 130 will program some hardware according to the parameters of the class based QoS requirements 514', and store the mapping between a QoS programming state and the downstream connection. The router 130 may further modify the IPv6 packet 520 by setting a setup state 526 in the hop-by-hop extension header 522 to indicate that the router 130 has been programmed to meet the class based QoS requirements. Setting the setup state 526 in the hop-by-hop extension header 522 may refer to updating the setup state 526 in the hop-by-hop extension header 522 or adding the setup state 526 into the hop-by-hop extension header 522. The setup state 526 may be included in a second setup state field. When the router 130 is programmed to the state meeting the class based QoS requirements 514', the setup state 526 may also include second forwarding information. The first forwarding information may include a finite size of data (mapping index) used as the reference to the QoS programming database. When the router 130 may not be programmed to the state meeting the class based QoS requirements 514' or the programming was failed, the router 130 will modify the IPv6 packet 520 by setting the setup state 526 to indicate that the router 130 has not been programmed to meet the class based QoS requirements 514'. In some embodiments, the first setup state field and the second setup state field refer to one same field including two or more setup states in the hop-by-hop extension header. In some embodiments, the first setup state field and the second setup state field are two different fields in the hop-by-hop extension header 522.

At operation 470, the router 130 sends the IPv6 packet 520 modified by the router 130 to the device 110.

At operation 480, the device 110 receives the IPv6 packet 520 and obtains the setup state 525 and the setup state 526 from the hop-by-hop extension header 522.

At operation 490, after device 110 determines that the setup state 525 and the setup state 526 indicate that router 130 and the router 140 meet the class based QoS requirements 514', the device 110 may send an IPv6 packet 530 including a TCP ACK 531 to the device 120. After the TCP ACK 531 is received by the device 120, a TCP 3-way handshake is done and the connection from the device 120 to the device 110 (a TCP connection) with differentiated QoS assurance is established.

In the situation that the setup state 525 and the setup state 526 indicate that one or more routers 130 and 140 do not meet the class based QoS requirements 514', the device 110 may have different choices. For example, the device 110 may send an IPv6 packet 530 to the device 120 to establish a downstream connection without class based QoS assurance (e.g. without differentiation of service between classes). In another example, the device 110 may stop establishing the downstream connection with the device 120 and start to check why some routers do not meet the class based QoS requirements 514'. In yet another example, the device 110 may adjust the class based QoS requirements 514' and start a new process for establishing a new downstream connection with QoS assurance based on the adjusted class based QoS requirements.

Figure 5:
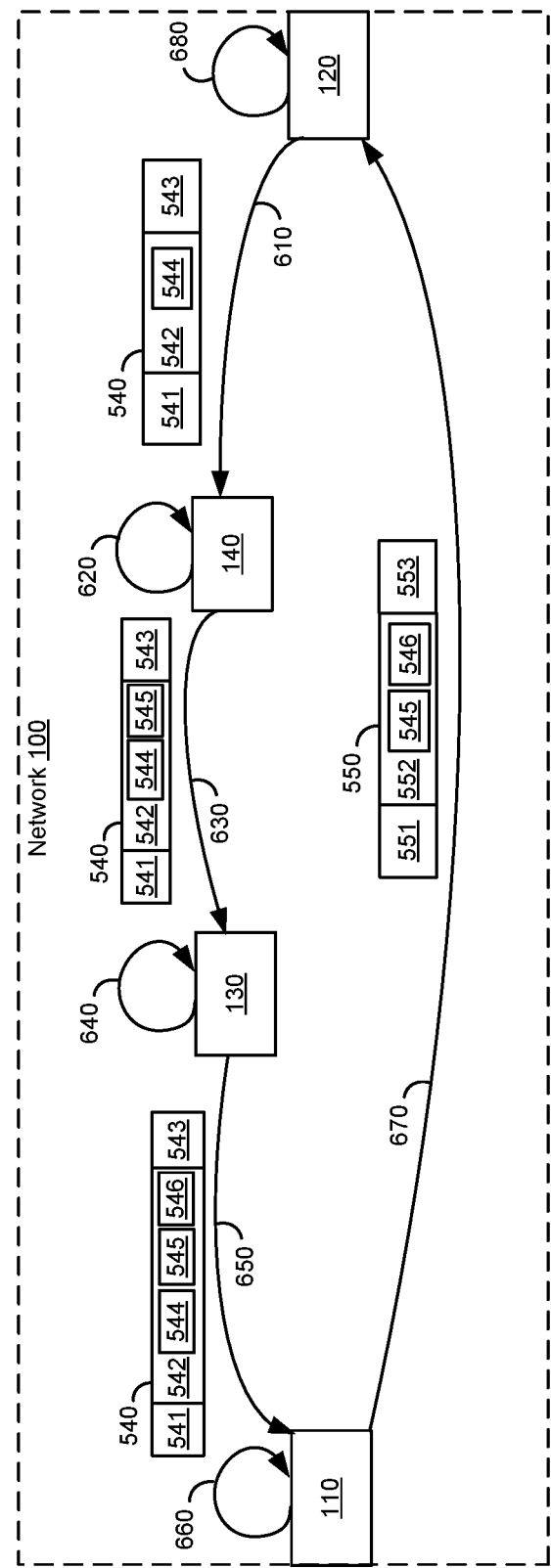
FIG. 5 illustrates a method for checking the state of a connection with differentiated service according to an embodiment of the disclosure.

FIG. 5 illustrates a method for checking the state of a connection with class based QoS assurance using in-band signaling during data communication according to an embodiment of the disclosure. While the example of FIG. 3 was generally directed to checking end-to-end class based QoS for upstream communication from device 110 to device 120 (e.g. established as shown in FIG. 2), the example of FIG. 5 is generally directed to checking end-to-end class based QoS for downstream communication from device 120 to device 110 (e.g. established as shown in FIG. 4).

At operation 610, after a downstream connection meeting class based QoS requirements (with QoS assurance) is established, e.g. the connection established according to operations 410-490, the device 120 may send IPv6 data packets of the downstream connection to the device 110, each data packet including a TCP data segment. An IPv6 data packet 540 of the IPv6 data packets sent by the device 120 includes a data payload 541, a hop-by-hop extension header 542 and an IPv6 header 543. The data payload 541 may be a TCP data segment including video and audio.

In some embodiments, the hop-by-hop extension header 542 includes a forwarding state 544 including the first forwarding information in setup state 525 and the second forwarding information in setup state 526.

In some other embodiments, the hop-by-hop extension header 542 does not include the first forwarding information and the second forwarding information. Then a router receiving the IPv6 data packet 540 will determine whether the IPv6 data packet 540 belongs to the downstream connection based on the 5 tuple of the IPv6 data packet 540. The 5 tuple includes a source IP address, a source port number, a destination IP address, a destination port number and transport protocol number or identifier of the IPv6 data packet 540. The source IP address, the destination IP address and the transport protocol number or identifier may be carried in the IPv6 header 543; the source port number and the destination port number may be carried in a TCP header, which is in the data payload 541. After determining that the IPv6 data packet 540 belongs to the downstream connection, the router will forward the IPv6 data packet 540 according to a forwarding state mapping to the downstream connection, where the forwarding according to the forwarding state meets the class based QoS requirements for the downstream connection.

At operation 620, the router 140 receives the IPv6 data packet 540 and determines whether the router 140 meets class based QoS requirements, e.g., class based QoS requirements 514', of the downstream connection. When the router 140 meets the class based QoS requirements, the first forwarding state 545 is modified, e.g. updated, by the router 140 to indicate that the router 140 meets the class based QoS requirements. When the router 140 does not meet the class based QoS requirements, the first forwarding state 545 is modified, e.g. updated, by the router 140 to indicate that the router 140 does not meet the class based QoS requirements 514'. In one example, when the hop-by-hop extension header 542 includes the first forwarding information, the router 140 determines whether it is a programed forwarding state mapping to the first forwarding information. If it has the programed forwarding state, the router 140 meets the class based QoS requirements. In another example, when the router 140 has a forwarding state mapping to the downstream connection to which the IPv6 data packet 540 belongs, the router 140 meets the class based QoS requirements.

At operation 630, the router 140 sends the modified IPv6 data packet 540 to the router 130. When the router 140 meets the class based QoS requirements, the router 140 sends the modified IPv6 data packet 540 to the router 130 based on the class based QoS requirements (e.g. using traffic shaping according to traffic shaping parameters). When the router 140 does not meet the class based QoS requirements, the router 140 sends the modified IPv6 data packet 540 to the router 130 without class based QoS. In some embodiments, the router 140 may even stop sending the modified IPv6 data packet 540 to the router 130 when the router 140 does not meet the class based QoS requirements.

At operation 640, after the router 130 receives the IPv6 data packet 540 of the downstream connection from the router 140, the router 130 determines whether the router 130 meets the class based QoS requirements 514'. Furthermore, the router 130 modifies the IPv6 data packet 540 by setting a second forwarding state 546 in the hop-by-hop extension header 542. When the router 130 meets the class based QoS requirements, the second forwarding state 546 indicates that the router 130 meets the class based QoS requirements. When the router 130 does not meet the class based QoS requirements, the second forwarding state 546 indicates that the router 130 does not meet the class based QoS requirements. At operation 650, the router 130 sends the IPv6 data packet 540 modified by the router 130 to the device 110. When the router 130 meets the class based QoS requirements, the router 130 sends the modified IPv6 data packet 540 to the device 120 based on the class based QoS requirements.

At operation 660, the device 110 receives the IPv6 data packet 540 from the router 130 and obtains the first forwarding state 545 and the second forwarding state 546 from the hop-by-hop extension header 542.

At operation 670, the device 110 sends an IPv6 packet 550 including a TCP ACK 551 to the device 120. The IPv6 packet 550 further includes the first forwarding state 545 and the second forwarding state 546 in the destination extension header 552 between the TCP ACK 551 and an IPv6 header 553. The IPv6 packet 550 may be sent via the router 130 and the router 140 to the device 120 or via other routers. The other routers may include only one of the routers 130 and 140 or include none of the routers 130 and 140.

At operation 680, the device 120 receives the IPv6 packet 550 including the TCP ACK 55 land consequently determines whether the downstream connection meets the class based QoS requirements based on the first forwarding state 545 and the second forwarding state 546. In one example, when each of routers 130 and 140 meets the class based QoS requirements, the downstream connection meets the class based QoS requirements; otherwise, the downstream connection does not meet the class based QoS requirements. If the downstream connection meets the class based QoS requirements, the device 120 may continue the downstream connection. If the downstream connection does not meet the class based QoS requirements, the device 120 may stop the downstream connection or continue the downstream connection without the expectation that the downstream connection meets the class based QoS requirements 154.

After the downstream connection is established, the data payload 541 in IPv6 data packet 540 may be a UDP data segment. Furthermore, for the IPv6 packet 550, the TCP ACK 551 is replaced by a UDP segment.

Figure 6:
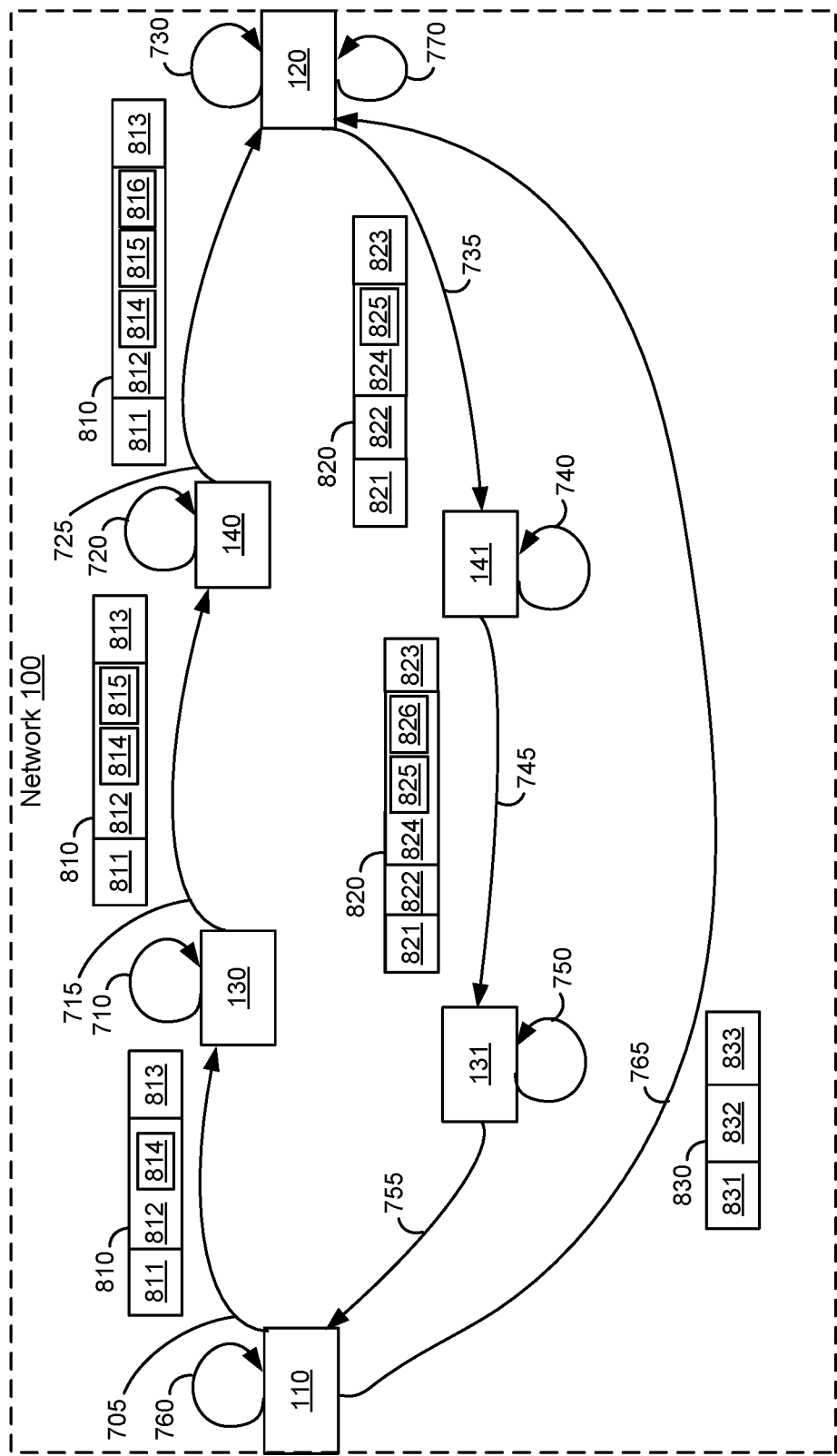
FIG. 6 illustrates a method for establishing a connection with differentiated service according to an embodiment of the disclosure.

FIG. 6 illustrates a method for establishing a connection with class based QoS using in-band signaling according to an embodiment of the disclosure. For example, the method of FIG. 6 may be used to establish a connection with end-to-end class based QoS requirements for both upstream and downstream communication between device 110 and device 120.

At operation 705, the device 110 sends an IPv6 packet 810 including a TCP SYN segment 811 to the router 130. The IPv6 packet 810 is used to establish a connection from the device 110 to the device 120 and the destination IPv6 address of the IPv6 packet 810 is the IPv6 address of the device 120. The IPv6 packet 810 further includes a hop-by-hop extension header 812. The hop-by-hop extension header 812 may be between an IPv6 header 813 and the TCP SYN segment 811 and carry class based QoS requirements 814 for an upstream connection (e.g. traffic shaping parameters for implementing a class based traffic shaping scheme). The upstream connection refers to a connection from the device 110 to the device 120. The hop-by-hop extension header 812 may be the hop-by-hop extension header defined in RFC 2460. According to RFC 2460, any IPv6 packet including the hop-by-hop extension header 812 needs to be examined by each router receiving the IPv6 packet, such as all routers on the connection, the device 110 and the device 120. The class based QoS requirements 814 includes values of some parameters of the upstream connection. The parameters may include information associated with the QoS of the upstream connection, such as one or more of the bandwidth, burst and latency for one or more classes of data packets. The class based QoS requirements 814 may indicate that the IPv6 packet 810 is used to establish an upstream connection with class based QoS assurance. For example, the bandwidth of the upstream connection with QoS assurance is no less than a value included in class based QoS requirements.

At operation 710, the router 130 receives the IPv6 packet 810 and obtains the class based QoS requirements 814 in the hop-by-hop extension header 812. The router 130 determines whether its capability of forwarding data packets of the upstream connection meets the class based QoS requirements 814. If the capability meets the class based QoS requirements 814, the router 130 programs its hardware according to the class based QoS requirements so that the router 130 will forward the data packets of the upstream connection based on the class based QoS requirements 814 (e.g. configuring a traffic shaper according to traffic shaping parameters of QoS requirements 814). The router 130 may further modify the IPv6 packet 810 by setting first information in the hop-by-hop extension header 812 of the IPv6 packet 810, wherein the first information indicates that the router meets the first QoS requirement. For example, the router 130 may update a first setup state 815 in the hop-by-hop extension header 812 to indicate that the router 130 meets the class based QoS requirements, where the setup state 815 is in a first setup state field in the hop-by-hop extension header 812. If router 130 may not meet the class based QoS requirements, the router 130 will update the first setup state 815 in the hop-by-hop extension header 812 to indicate that the router 130 does not meet the class based QoS requirements.

At operation 715, router 130 sends the modified IPv6 packet 810 to the router 140 according to the destination IP address of the IPv6 packet 810.

At operation 720, the router 140 receives the IPv6 packet 810 from the router 130 and obtains the class based QoS requirements 814 in the hop-by-hop extension header 812. Similar to the router 130, the router 140 determines whether its capability of forwarding data packets of the upstream connection meets the class based QoS requirements 814. If the capability of router 140 meets the class based QoS requirements 814, the router 140 programs its hardware according to the class based QoS requirements so that the router 140 will forward the data packets of the upstream connection based on the class based QoS requirements 814 (e.g. using a traffic shaping scheme configured according to traffic shaping parameters of QoS requirements 814). The router 140 may further modify the IPv6 packet 810 by setting second information in the hop-by-hop extension header 812 of the IPv6 packet 810, where the second information indicates that the router 140 meets the class based QoS requirements 814. For example, the router 140 may update a second setup state 816 in the hop-by-hop extension header to indicate that the router 140 meets the class based QoS requirements 814, where the second setup state 816 is in a second setup state field in the hop-by-hop extension header. If the router 140 may not meet the class based QoS requirements 814, the router 140 will update the setup state in the hop-by-hop extension header 812 to indicate that the router 140 does not meet the class based QoS requirements 814. In some embodiments, the first setup state field and the second setup state field are two different fields in the hop-by-hop extension header. In some embodiments, the first setup state field and the second setup state field refer to one same field including two or more setup states in the hop-by-hop extension header 812.

At operation 725, the router 140 sends the IPv6 packet 810 modified by the router 140 to the device 120 according to the destination IP address of the IPv6 packet 810.

At operation 730, the device 120 receives the IPv6 packet 810 from the router 140 and determines that each router on the upstream connection meets the class based QoS requirements 814 based on the first information and the second information in the hop-by-hop extension header.

At operation 735, the device 120 sends an IPv6 packet 820 including a TCP SYN-ACK segment 821 to the device 110. The destination IP address of the IPv6 packet 820 may be the IP address of the device 110. The IPv6 packet 820 further includes a destination extension header 822 carrying third information indicating that router 130 meets the QoS requirement 814, e.g. the first setup state 155, and the fourth information indicating that router 140 meets the QoS requirement 814, e.g. the second setup state 156. The destination extension header 822 may be between the TCP SYN-ACK segment 821 and an IPv6 header 823. Moreover, the IPv6 packet 820 includes a hop-by-hop extension header 824. The hop-by-hop extension header 824 includes class based QoS requirements 825 for a downstream connection from the device 120 to the device 110. The IPv6 packet 820 is sent based on its destination IP address.

At operation 740, the router 141 receives the IPv6 packet 820 and obtains the class based QoS requirements 825 (e.g. traffic shaping parameters) in the hop-by-hop extension header 824. The router 141 determines whether its capability of forwarding data packets of the downstream connection meets the class based QoS requirements 825. If the capability meets the class based QoS requirements 825, the router 141 will forward the data packets of the downstream connection based on the class based QoS requirements 825. The router 141 may further modify the IPv6 packet 820 by setting the hop-by-hop extension header 824 of the IPv6 packet 820 to indicate that the router 141 meets the class based QoS requirements 825. If router 141 may not meet the class based QoS requirements 825, the router 141 will set the hop-by-hop extension header 824 to indicate that the router 130 does not meet the class based QoS requirements. In some embodiments, the setting may refer to setting a setup state 826 in the hop-by-hop extension header 824.

At operation 745, the router 141 sends the IPv6 packet 820 modified by the router 141 to the router 131 based on the destination IP address of the IPv6 packet 820.

At operation 750, the router 131 receives the IPv6 packet 820 and obtains the class based QoS requirements 825 in the hop-by-hop extension header 824. The router 131 determines whether its capability of forwarding data packets of the downstream connection meets the class based QoS requirements 825. If the capability meets the class based QoS requirements 825, the router 131 will forward the data packets of the downstream connection based on the class based QoS requirements 825. The router 131 may further modify the IPv6 packet 820 by setting the hop-by-hop extension header 824 of the IPv6 packet 820 to indicate that the router 131 meets the class based QoS requirements 825. If router 131 may not meet the class based QoS requirements 825, the router 141 will set the hop-by-hop extension header 824 to indicate that the router 130 does not meet the class based QoS requirements. In some embodiments, the setting may refer to setting a setup state in the hop-by-hop extension header 824.

At operation 755, the router 131 sends the IPv6 packet 820 modified by the router 131 to the device 110.

At operation 760, the device 110 obtains the third information and the fourth information from the destination extension header 822. Based on the obtained information, the router 131 determines that all routers on the upstream connection meet the class based QoS requirements. Therefore, the upstream connection may be established if the 3-way handshake is finished. Furthermore, based on the hop-by-hop extension header 824, the device 110 may determine whether all the routers on the downstream connection meet the class based QoS requirements 825.

At operation 765, the device 110 sends an IPv6 packet 830 including a TCP ACK segment 831 to the device 120. The IPv6 packet 830 is sent after the device 110 determines that all the routers on the downstream connection meet the class based QoS requirements 825. Thus, the IPv6 packet 830 includes a destination extension header 832 between the TCP ACK segment 831 and an IPv6 header 833, where the destination extension header 832 is set to indicate that all the routers on the downstream connection meet the class based QoS requirements 825. For example, the destination extension header 832 is set to indicate that routers 131 and 141 meet the class based QoS requirements 825.

At operation 770, the device 120 receives the IPv6 packet 830 from the device 110. The TCP ACK segment 831 indicates that the upstream connection with class based QoS is established. Furthermore, the destination extension header 832 indicates that the downstream connection with class based QoS is also established. While the upstream connection and downstream connections pass through different networked devices in this example (upstream connection through router 130 and router 140, downstream connection through router 141 and router 131), this method may also be used where upstream and downstream connections use the same routers (e.g. downstream connection through router 140 and router 130, like the upstream connection).

Figure 7:
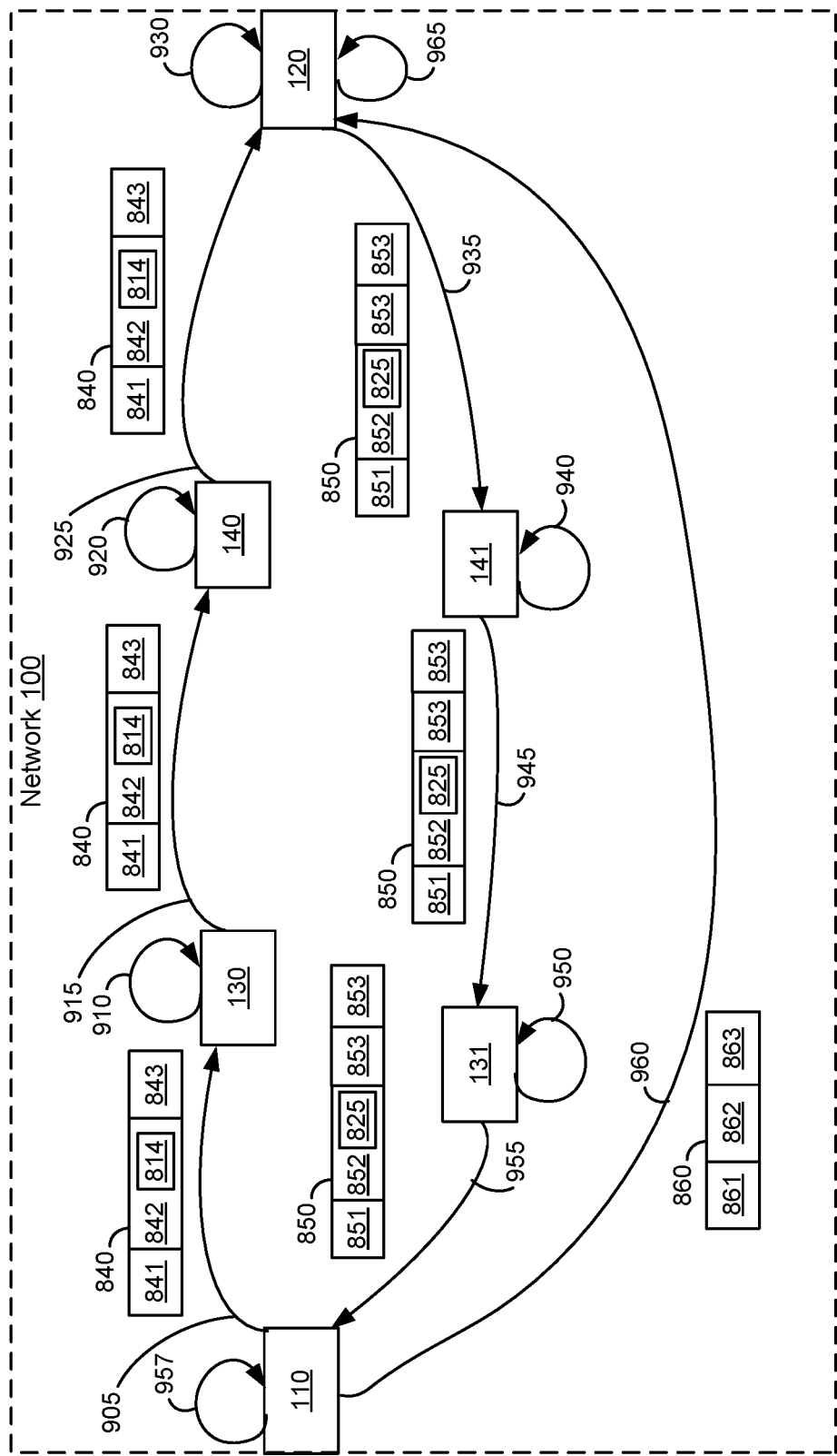
FIG. 7 illustrates a method for checking the state of a connection with differentiated service according to an embodiment of the disclosure.

FIG. 7 illustrates a method for checking the state of a connection with class based QoS using in-band signaling during data communication according to an embodiment of the disclosure. The example of FIG. 7 is generally directed to checking end-to-end class based QoS for both upstream and downstream communication between device 120 and device 110 (e.g. established as shown in FIG. 6).

After the upstream connection from the device 110 to the device 120 via the routers 130 and 140 and the downstream connection from the device 120 to the device 110 via the routers 141 and 131 are established, the devices 110 and 120 may send data via the connections. During the data transmission, the state of the two connections may be checked.

At operation 905, the router 110 sends an IPv6 data packet 840 of the upstream connection to the router 120. The IPv6 data packet 840 includes a TCP data segment 841, a hop-by-hop extension header 842 and an IPv6 header 843, where the hop-by-hop extension header 842 includes the class based QoS requirements 814.

At operation 910, the router 130 receives the IPv6 data packet 840 and determines whether the router 130 meets the class based QoS requirements 814. When the router 130 meets the class based QoS requirements 814, the hop-by-hop extension header 842 is modified to indicate that router 130 meets the class based QoS requirements 814. When the router 130 does not meet the class based QoS requirements 154, the hop-by-hop extension header 842 is modified to indicate that the router 130 does not meet the class based QoS requirements 814.

At operation 915, the router 130 sends the IPv6 data packet 840 modified by router 130 to the router 140.

At operation 920, the router 140 receives the IPv6 data packet 840 and determines whether the router 140 meets the class based QoS requirements 814. When the router 140 meets the class based QoS requirements 814, the hop-by-hop extension header 842 is modified to indicate that 140 meets the class based QoS requirements 814. When the router 140 does not meet the class based QoS requirements

814, the hop-by-hop extension header 842 is modified to indicate that the router 140 does not meet the class based QoS requirements 814.

At operation 925, the router 140 sends the IPv6 data packet 840 modified by router 140 to the device 120.

At operation 930, the device 120 receives the IPv6 packet 840 from the router 140 and determines that each router on the upstream connection meets the class based QoS requirements 814 based on the first information and the second information in the hop-by-hop extension header 842.

At operation 935, the device 120 sends an IPv6 data packet 850 to the device 110. The IPv6 data packet 850 includes a TCP data segment 851, a hop-by-hop extension header 852, a destination extension header 853 and an IPv6 header 854. The destination extension header 853 is set to indicate whether all the routers on the upstream connection meet the class based QoS requirements 814. The hop-by-hop extension header 852 includes the class based QoS requirements 825.

At operation 940, the router 141 receives the IPv6 data packet 850 and determines whether the router 141 meets the class based QoS requirements 825. When the router 141 meets the class based QoS requirements 825, the hop-by-hop extension header 852 is modified to indicate that router 141 meets the class based QoS requirements 825. When the router 141 does not meet the class based QoS requirements 825, the hop-by-hop extension header 852 is modified to indicate that the router 141 does not meet the class based QoS requirements 825.

At operation 945, the router 141 sends the IPv6 data packet 850 modified by the router 141 to the router 131.

At operation 950, the router 131 determines whether the router 131 meets the class based QoS requirements 825. When the router 131 meets the class based QoS requirements 825, the hop-by-hop extension header 852 is modified to indicate that router 131 meets the class based QoS requirements 825. When the router 131 does not meet the class based QoS requirements 825, the hop-by-hop extension header 852 is modified to indicate that the router 131 does not meet the class based QoS requirements 825.

At operation 955, the router 131 sends the IPv6 data packet 850 modified by the router 131 to the device 110.

At operation 957, the device 110 determines whether the upstream connection meets the class based QoS requirements 814 based on destination extension header 853.

At operation 960, the device 110 sends an IPv6 packet 860 including a TCP ACK 861 to the device 120. The IPv6 packet 860 further includes a destination extension header 862 and an IPv6 header 863, where the destination extension header 862 is set to indicate whether all the routers on the downstream connection meet the class based QoS requirements 825.

At operation 965, the device 120 receives the IPv6 packet 860 and determines whether the downstream connection meets the class based QoS requirements 825.

When a network is configured for end-to-end differentiated services (e.g. using in-band signaling as described in any of the examples above or otherwise) data packets may be managed differently according to their class (e.g. a router may manage data packets of different classes differently by queueing them differently or otherwise). Data packets may be classed into different classes and may be identified accordingly in various ways. For example, IPv6 data packets include a Differentiated Services Code Point (DSCP) field in the IPv6 header, which may be used to indicate which class the data packet belongs to. According to aspects of the present technology, a DSCP value for a packet may be selected at an ingress router of a network. A suitable DSCP value may be selected from a list of DSCP values that conforms to a standard (e.g. as provided in IETF RFC 4594, which is incorporated by reference herein in its entirety) or otherwise. In some embodiments, one or more DSCP values may be used that are not part of a standard. For example, a first DSCP value (which may or may not be listed in IETF RFC 4594) according to the present technology may indicate Latency Guaranteed Service (LGS). A second DSCP value (which may or may not be listed in IETF RFC 4594) according to the present technology may indicate Bandwidth Guaranteed Service (BGS). A third DSCP value (which may or may not be listed in IETF RFC 4594) according to the present technology may indicate Best Efforts Service (BES). Aspects of the present technology may be implemented using one or more of these DSCP values or otherwise (e.g. using only DSCP values of IETF RFC 4594 or using some other system of indicating a class to which a packet belongs).

Figure 8:
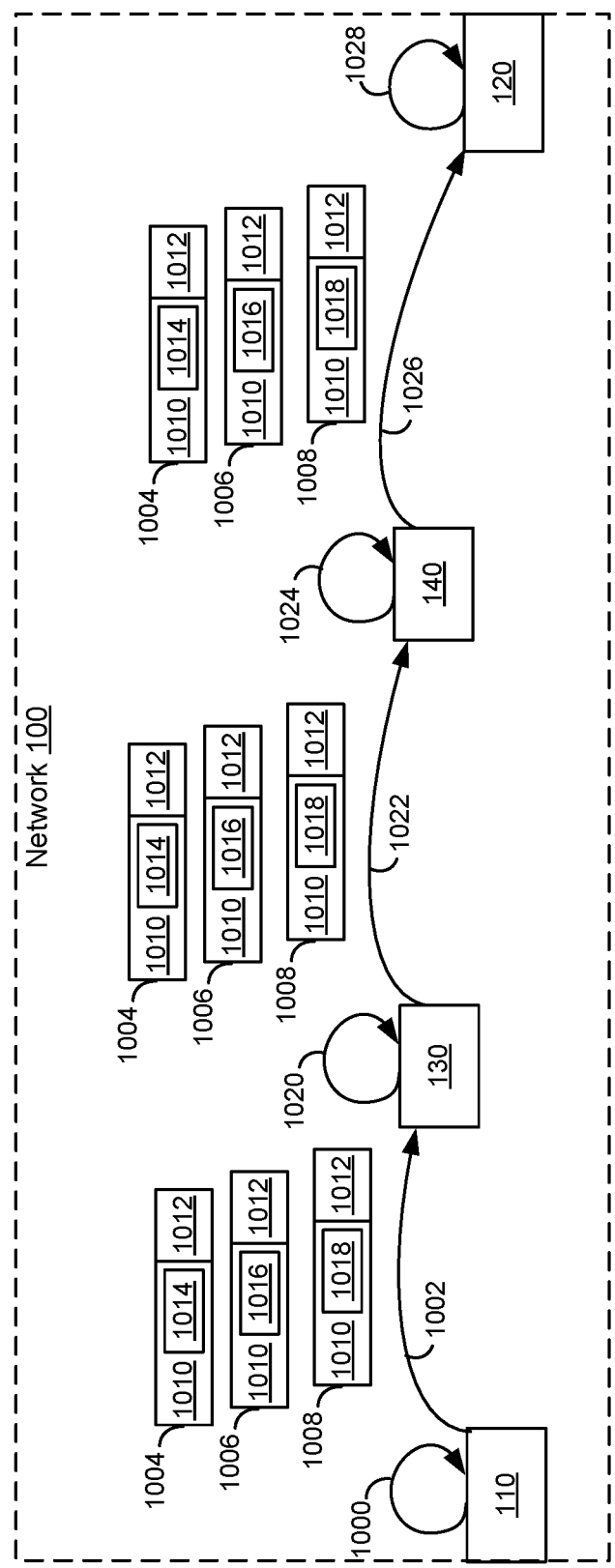
FIG. 8 illustrates a method for providing differentiated service using traffic shaping according to an embodiment of the disclosure.

FIG. 8 illustrates an example of device 110 operating as an ingress router of network 100 to classify data packets according to a classification scheme that includes at least three classes (e.g. LGS, BGS, and BES). At operation 1000, device 110 classifies packets by setting appropriate DSCP values in IPv6 headers of packets. Data packets 1004, 1006, and 1008 are classified. Each of data packets 1004, 1006, and 1008 includes a header 1010 and a payload 1012, with each data packet containing a different DSCP value in its header. For example, device 110 classifies data packet 1004 as an LGS packet and sets LGS DSCP value 1014 in header 1010 of data packet 1004. Device 110 classifies data packet 1006 as a BGS packet and sets BGS DSCP value 1016 in header 1010 of data packet 1006. Device 110 classifies data packet 1008 as a BES packet and sets BES DSCP value 1018 in header 1010 of data packet 1008.

At operation 1002, data packets 1004, 1006, 1008 are sent from device 110 to router 130.

At operation 1020, router 130 receives data packets 1004, 1006, 1008 and reads headers (e.g. parsing data packets to identify headers) including respective DSCP values for each data packet. These DSCP values indicate respective classes for data packets 1004, 1006, 1008. Router 130 handles packets 1004, 1006, 1008 according to their respective classes (e.g. according to a traffic shaping scheme implementing differentiated services configured by traffic shaping parameters). For example, in response to reading LGS DSCP value 1014 in header 1010 of data packet 1004, router 130 may prioritize data packet 1004 (e.g. placing it in a dedicated queue). In response to reading BGS DSCP value 1016 in header 1010 of data packet 1006, router 130 may apply a lower priority to data packet 1006 than data packet 1004 (e.g. placing in a different queue with lower priority). In response to reading BES DSCP value 1018 in header 1010 of data packet 1008, router 130 may apply lowest priority to data packet 1008 (which may be a default priority) and may place it in a low-priority queue.

At operation 1022, data packets 1004, 1006, 1008 are sent from router 130 to router 140.

At operation 1024, router 140 receives data packets 1004, 1006, 1008 and reads headers (e.g. parsing data packets to obtain headers) including respective DSCP values for each data packet. These DSCP values indicate respective classes for data packets 1004, 1006, 1008. Router 140 handles packets 1004, 1006, 1008 according to their respective classes (e.g. according to a traffic shaping scheme implementing differentiated services configured by traffic shaping parameters). For example, in response to reading LGS DSCP value 1014 in header 1010 of data packet 1004, router 140 may prioritize data packet 1004 (e.g. placing it in a dedicated queue). In response to reading BGS DSCP value 1016 in header 1010 of data packet 1006, router 140 may apply a lower priority to data packet 1006 than data packet 1004 (e.g. placing in a different queue with lower priority). In response to reading BES DSCP value 1018 in header 1010 of data packet 1008, router 140 may apply lowest priority to data packet 1008 (which may be a default priority) and may place it in a low-priority queue.

At operation 1026, data packets 1004, 1006, 1008 are sent from router 140 to device 120.

At operation 1028, device 120 receives data packets 1004, 1006, 1008 and reads headers including respective DSCP values for each data packet. These DSCP values indicate respective classes for data packets 1004, 1006, 1008. Device 120 handles packets 1004, 1006, 1008 according to their respective classes (e.g. according to differentiated services previously configured). For example, in response to reading LGS DSCP value 1014 in header 1010 of data packet 1004, router 140 may prioritize data packet 1004 (e.g. placing it in a dedicated queue). In response to reading BGS DSCP value 1016 in header 1010 of data packet 1006, router 140 may apply a lower priority to data packet 1006 than data packet 1004 (e.g. placing in a different queue with lower priority). In response to reading BES DSCP value 1018 in header 1010 of data packet 1008, router 140 may apply lowest priority to data packet 1008 (which may be a default priority) and may place it in a low-priority queue. Device 120 is configured as an egress device in this example and data packets 1004, 1006, 1008 may be sent out of network 100 through device 120. It will be understood that, because different data packets are treated differently at each step through network 100, data packet 1004 may travel from device 110 to device 120 through network 100 rapidly (in conformance with a guaranteed latency requirement), data packet 1006 may travel from device 110 to device 120 through network 100 less rapidly (in conformance with a guaranteed bandwidth requirement), and data packet 1008 may travel from device 110 to device 120 through network at a relatively slow rate (in conformance with a best efforts requirement) so that even if data packets 1004, 1006, 1008 start at device 110 together, they may arrive at device 120 (and exit network 100) at different times.

Figure 9A:
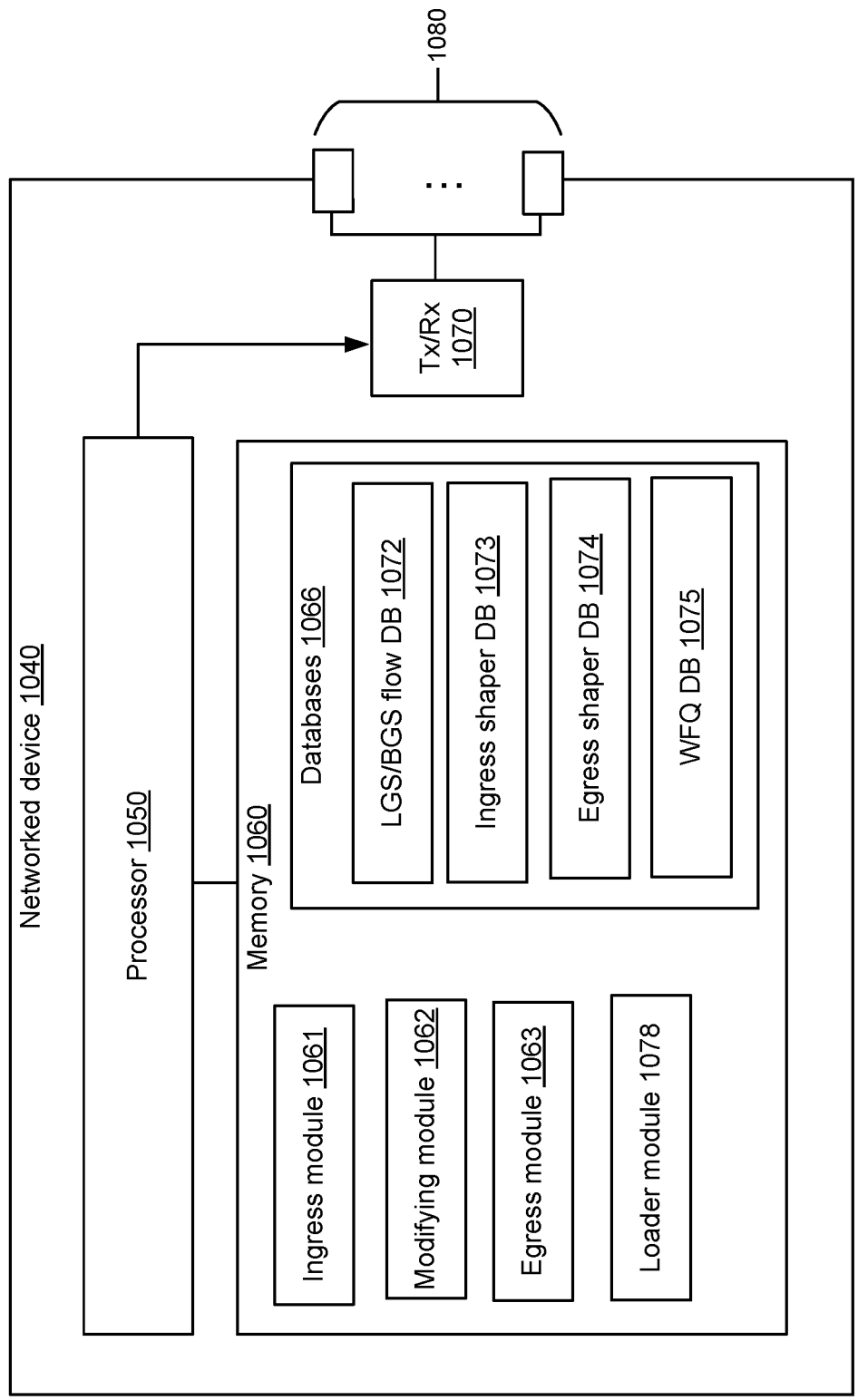
FIG. 9A illustrates a networked device configured according to an embodiment of the disclosure.

FIG. 9A is a block diagram of a networked device 1040 according to an embodiment of the disclosure. In some embodiments, the networked device 1040 may refer to the router 130 or router 140. In some embodiments, networked device 1040 may refer to the router 131 or 141. In some embodiments, networked device 1040 may refer to device 110 (e.g. configured as an ingress router of network 100). In some embodiments, networked device 1040 may refer to device 120 (e.g. configured as an egress router of network 100). As shown in FIG. 9A, the networked device 1040 may include a processor 1050, a memory 1060 coupled to processor 1050, transceivers (Tx/Rx) 1070, and ports 1080 coupled to Tx/Rx 1070. Ports 1080 are configured for communication over a network and may be considered to form a network interface (which may include a physical interface for connection of wires in a wired network and/or may include a physical interface for wireless communication in a wireless network). The processor 1050 may be implemented as a general processor or may be part of one or more application specific integrated circuits (ASICs) and/or digital signal processors (DSPs). The processor 1050 may refer to a single processor or a plurality of processors. Memory 1060 may include a cache for temporarily storing content, e.g., a random-access memory (RAM). Additionally, the memory 1060 may include a long-term storage, e.g., a read-only memory (ROM). In one embodiment, the memory 1060 may include multiple software modules, such as an ingress module 1061 (receiving module), a modifying module 1062 and an egress module 1063 (sending module). By executing instructions in the software modules, the processor 1050 may perform a plurality of operations. In some embodiments, when a module is configured to perform an operation, it may mean that the processor 1050 is configured to execute instructions in the module to perform the operation. By executing the instructions in the memory 1060, the processor 1050 may perform, completely or partially, all operations performed by one or more of routers 130, 140 devices 110, 120 and/or other components of network 100. The networked device 1040 may refer to any device having the capability of routing IP packets based on their destination IP addresses.

Memory 1060 also includes databases 1066 which may contain information for configuration and operation of networked device 1040. For example, databases 1066 may contain data regarding class based QoS requirements for one or more classes of data packets and parameters associated with such requirements. For example, databases 1066 may include traffic shaping parameters for configuring ingress module 1061 and egress module 1063 to implement one or more traffic shaping scheme to achieve a required QoS for a class of data packets. Data in databases 1066 may be obtained from in-band communication (e.g. in-band signaling as described above) so that networked device 1040 and any other routers of network 100 may be configured to achieve different QoS for different classes of data packets. Databases 1066 are shown as including four databases in this example: LGS/BGS flow DB 1072, Ingress Shaper DB 1073, Egress Shaper DB 1074, and Weighted Fair Queueing (WFQ) DB 1075. In other examples different numbers of databases may be used to implement aspects of the present technology. Memory 1060 also includes loader module 1078, which is configured to load data in databases 1066 (e.g. in one or more of LGS/BGS flow DB 1072, Ingress Shaper DB 1073, Egress Shaper DB 1074, and WFQ DB 1075) based on in-band communication. Data may be loaded to initialize databases 1066 and may be updated as appropriate by loading different parameter values to reflect different traffic shaping schemes. Loader module 1078 in memory 1060 may, when loaded in processor 1050, cause circuits of processor 1050 to perform database loading functions (e.g. to be configured as a database loading circuit to obtain the traffic shaping parameters from in-band communication received in a data packet by the network interface). Thus, an example of a database loading circuit may be a processor configured by software or firmware to perform data base loading. In other examples, a database loading circuit may be a dedicated circuit, a programmable logic device (PLD), or some combination of one of more of these components.

Ingress module 1061 is configured to receive a first IPv6 packet for establishing a first connection, where the first IPv6 packet includes first class based QoS requirements for the first connection in a hop-by-hop extension header of the first IPv6 packet. The modifying module 1062 is configured to modify the first IPv6 packet by setting first information in the hop-by-hop extension header of the first IPv6 packet, where the first information indicates that the router meets the first QoS requirement. The egress module 1063 is configured to send the modified first IPv6 packet to a second router based on a destination IP address of the modified first IPv6 packet.

The ingress module 1061 may further be configured to receive a second IPv6 packet for establishing the first connection from a second router, where the second IPv6 packet carries second information in a destination extension header in the second IPv6 packet, where the second information indicates that a plurality of routers including the first router meet the first QoS requirement. The egress module 1063 may further be configured to send the second IPv6 packet to a next hop based on a destination IP address of the second IPv6 packet. For example, a routing table in the networked device 1040 may route data packets from ingress module 1061 (or instance thereof) to an egress module 1063 (or instance thereof) based on the destination IP address of the second IPv6 packet.

Furthermore, the ingress module 1061 not only receives packets for establishing a connection, it may be further configured to receive data packets of the connection. For example, ingress module 1061 is configured to receive an IPv6 data packet of the first connection. Correspondingly, the modifying module 1062 is configured to modify the IPv6 data packet by setting third information in a hop-by-hop extension header of the IPv6 data packet, wherein the third information indicates that sending of the modified IPv6 data packet is based on the first QoS requirement. The egress module 1063 is configured to send the modified IPv6 data packet to a next hop based on a destination IP address of the IPv6 data packet.

In some embodiments, the first IPv6 packet for establishing a first connection may refer to the IPv6 packet 150, the second IPv6 packet for establishing the first connection may refer to IPv6 packet 160, and the IPv6 data packet of the first connection may refer to IPv6 data packet 180.

In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 810, the second IPv6 packet for establishing the first connection may refer to IPv6 packet 820, and the IPv6 data packet of the first connection may refer to IPv6 data packet 840.

Figure 9B:
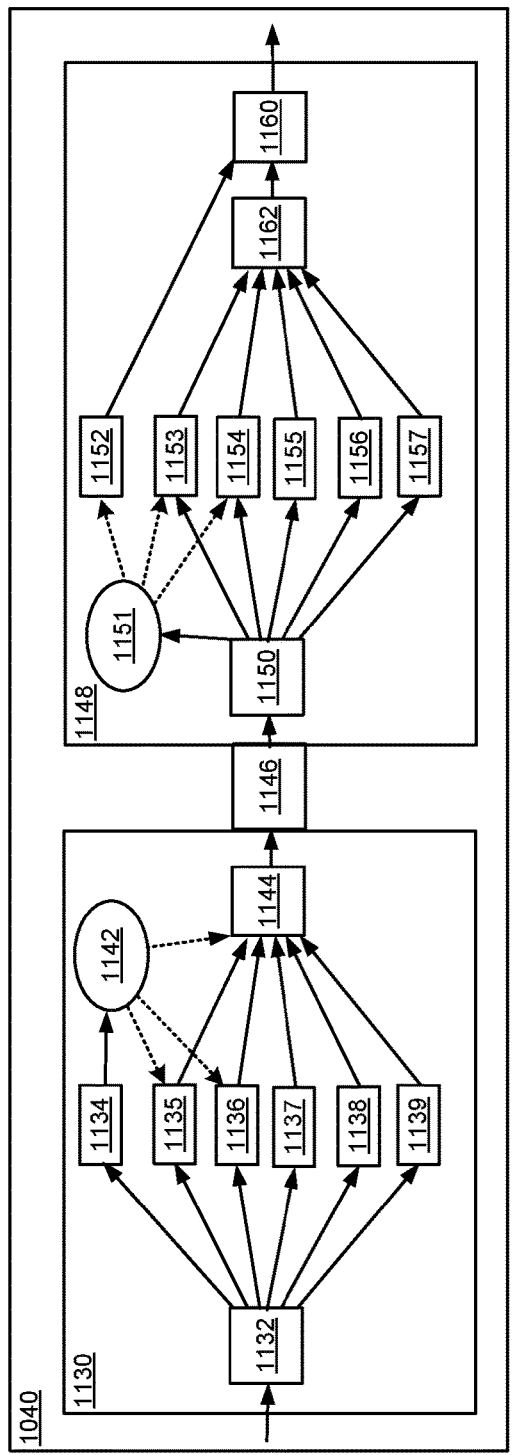
FIG. 9B illustrates an example of operation of a networked device according to an embodiment of the disclosure.

FIG. 9B illustrates an example showing how data packets may be handled at an ingress router of a network (e.g. networked device 1040 of FIG. 9A configured as an ingress router). In this example, LGS packets may be classified in a dedicated class that may be added to a previously existing standard (e.g. a new DSCP value assigned by the International Assigned Numbers Authority (IANA)) or alternatively may be mapped to the EF class specified in RFC 4594 (e.g. for backward compatibility) so that DSCP classes conform to the standard of RFC 4594 (in other examples, classes may be used that do not conform to this standard). Traffic shaping is applied using a single rate Three Color Marker (srTCM) scheme (e.g. as specified in RFC 2697, which is incorporated by reference herein in its entirety). An srTCM scheme may be specified in terms of traffic shaping parameters such as Committed Information Rate (CIR) in bps, committed Burst Size (CBS) and Exceeded Burst size (EBS) in bytes and corresponding values (traffic shaping parameter values) may be loaded and stored in databases of routers (e.g. obtained from in-band signaling). A two rate TCM scheme may alternatively be used (e.g. a trTCM scheme as specified in RFC 4115, which is incorporated by reference herein in its entirety). A trTCM scheme may be specified in terms of CIR, Peak Information Rate (PIR), CBS and EBS. In some cases, only CIR may be required to specify a traffic shaping scheme.

Data packets received by networked device 1040 (e.g. through one of ports 1080 and Tx/Rx 1070) are sent to an ingress shaper module 1130, which may be part of ingress module 1061 or may correspond to ingress module 1061 configured according to a configuration stored in databases 1066 (e.g. configured by traffic shaping parameters stored in databases 1066). Ingress shaper module 1130 includes classifier 1132. Classifier 1132 checks to see if a packet has in-band signaling information (e.g. class based QoS requirements in a hop-by-hop extension header as previously shown). If in-band signaling information is provided, the in-band signaling information is read to identify QoS requirements. These requirements may be checked against a database (e.g. "LGS/BGS flow DB 1072" for LGS and BGS classes) to see if the required service is allowed (e.g. may check a Service Level Agreement (SLA) to determine if the QoS requirements are in conformance with the SLA). If the service is allowed, the classifier may check to see that there are sufficient resources available. If there are insufficient resources, the in-band signaling may be updated to indicate that the service is rejected, and the packet may be classified accordingly. If there are sufficient resources then QoS parameters may be updated in one or more database (e.g. in one or more of LGS/BGS flow DB 1072, Ingress Shaper DB 1073, Egress Shaper DB 1074 and/or WFQ DB 1075).

Classifier 1132 sends packets to appropriate markers 1134 to 1139 according to a classification rule (e.g. from LGS/BGS flow DB 1072). A classification rule may include what class should be used if the expected service is rejected due to admission control, resource limit, or otherwise. Markers 1134 to 1139 set DSCP bits in data packet headers to corresponding DSCP values. For example, LGS marker 1134 (which may be an EF marker) sets DSCP bits in data packet headers to indicate that data packets belong to the EF class, AF41 marker 1135 sets DSCP bits in data packet headers to indicate that data packets belong to the AF41 class, AF31 marker 1136 sets DSCP bits in data packet headers to indicate that data packets belong to the AF31 class, AF21 marker 1137 sets DSCP bits in data packet headers to indicate that data packets belong to the AF21 class, AF11 marker 1138 sets DSCP bits in data packet headers to indicate that data packets belong to the AF11 class, and BE marker 1139 sets DSCP bits in data packet headers to indicate that data packets belong to the BE class. LGS data packets are sent to ingress traffic shaper 1142 (ingress shaper), which may perform traffic shaping according to traffic shaping rules (e.g. according to a srTCM, trTCM, or leaky bucket scheme). For example, ingress shaper 1142 may measure the LGS class rate and mark a data packet with a different color according to a rule obtained from a data base (e.g. Ingress Shaper DB 1073). For example, ingress shaper 1142 may be configured to direct certain LGS packets (green packets) to joiner 1144, where packets with different marking are rejoined. Ingress shaper 1142 may send certain LGS packets (yellow packets) to AF41 marker 1135 to be re-marked as AF41 data packets. Ingress shaper 1142 may send certain LGS packets (red packets) to one or more lower priority markers (e.g. AF31 marker 1136 as shown) to be re-marked as lower level packets (e.g. AF31 packets). In some cases, red packets may be dropped. Data packets are sent from markers 1135-1139 to joiner 1144 where they are rejoined with LGS packets from ingress shaper 1142 and sent to forwarding module 1146. Packets may be marked "with different colors" by an appropriate code, e.g. a code added in the DS field of an IP packet, as described in RFC 2697 (single rate) and RFC 2698 (two rate), which describe setting the DS field of a packet to mark the color as green, yellow, or red. RFC 2698 is also incorporated by reference herein in its entirety. Re-marking may replace such a code with an updated code to reflect a different color. As described in RFC 2697, the "color" of a packet is a way to describe categorizations of packets that can be implemented with, for example, the code in the DS field.

Forwarding module 1146 may forward data packets to appropriate router output interfaces according to destination addresses of data packets (e.g. according to a routing table).

An Egress shaper module 1148 receives data packets from forwarding module 1146 and applies egress traffic shaping. Egress shaper module 1148 may be part of egress module 1063 or may correspond to egress module 1063 configured according to a configuration stored in databases 1066. Classifier 1150 checks the DSCP value of received data packets and sends the data packets to egress traffic shaper 1151 (egress shaper) and queues 1153-1157 according to the classes indicated by DSCP bits in respective data packet headers. For example, data packets having DSCP bits in their data packet header set to a value indicating LGS class are sent to egress shaper 1151, data packets having DSCP bits in their data packet header set to a value indicating AF41 class are sent to AF4x queue 1153, data packets having DSCP bits in their data packet header set to a value indicating AF31 class are sent to AF3x queue 1154, data packets having DSCP bits in their data packet header set to a value indicating AF21 class are sent to AF2x queue 1155, data packets having DSCP bits in their data packet header set to a value indicating AF11 class are sent to AF1x queue 1156, and data packets having DSCP bits in their data packet header set to a value indicating BE class are sent to BE queue 1157. Egress shaper 1151 may perform traffic shaping according to traffic shaping rules (e.g. according to a srTCM, trTCM, or leaky bucket scheme). Egress shaper 1151 may measure the LGS class rate and mark a data packet with a different color according to a rule obtained from a database (e.g. Egress Shaper DB 1074). For example, egress shaper 1151 may send some packets (green packets) to LGS queue 1152. Egress shaper 1151 may send some packets (yellow packets) to one of the lower priority queues (e.g. AF4x queue 1153). This may be configurable, and, in some cases, yellow packets may be sent to different queues or may be dropped. Egress shaper 1151 may send some packets (red packets) to one of the lower priority queues (e.g. AF3x queue 1154). This may be configurable, and, in some cases, red packets may be sent to different queues or may be dropped.

Data packets in LGS queue 1152 are sent directly to priority scheduler 1160 so that packets from EF queue 1152 (green packets) are prioritized for low latency. From priority scheduler 1160 data packets are sent to one of ports 1080. Data packets from queues 1153-1157 are selected by an appropriate weighted fair queuing scheme (e.g. a weighted round robin scheme in the illustrated example). Weighted Round Robin (WRR) scheduler 1162 manages queues 1153-1157 by applying a WRR scheme to select data packets from queues 1153-1157 (e.g. according to an appropriate WRR scheduling scheme) and sends data packets to priority scheduler 1160, which schedules packets according to priority (e.g. LGS packets sent first).

While the example of FIG. 9B shows traffic shaping at both ingress and egress sides, in other examples, traffic shaping may only occur at one side. For example, ingress traffic shaping may occur at an ingress router and subsequent routers along a data path may perform only egress traffic shaping.

While the example of FIG. 9B is directed to using a new LGS class or using the EF class for LGS, other implementations are possible according to the present technology. For example, the AF41 class may be used for LGS with EF class packets having higher priority.

Figure 10:
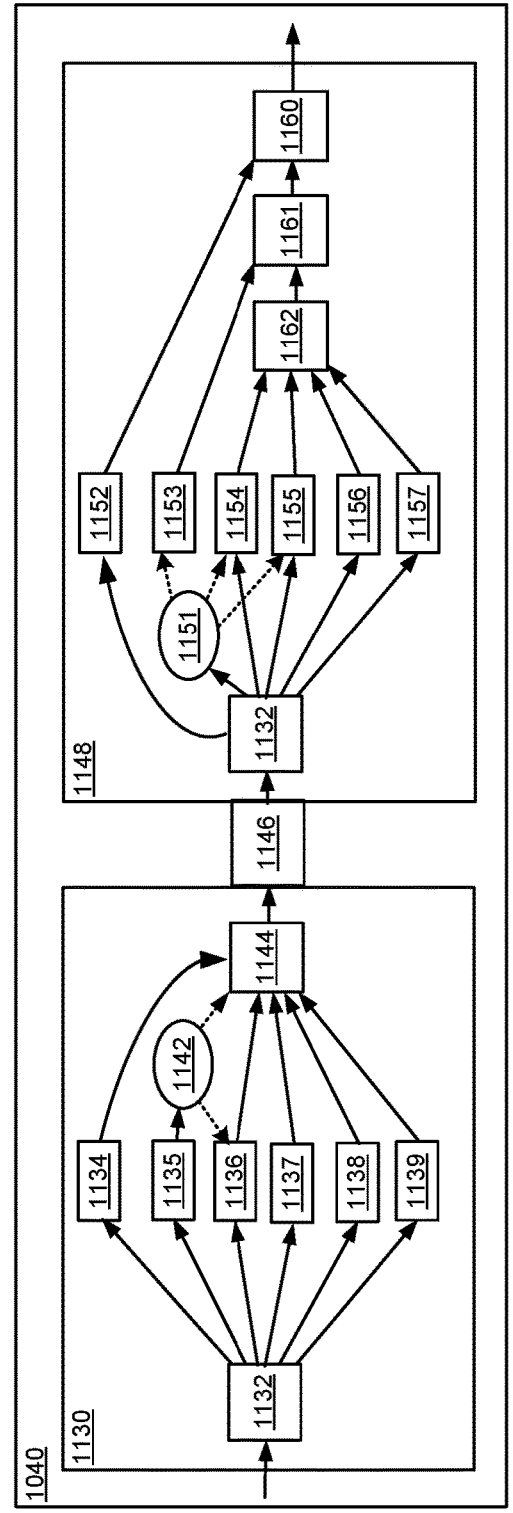
FIG. 10 illustrates an example of operation of a networked device according to an embodiment of the disclosure.

FIG. 10 illustrates an example of networked device 1040 configured to use a newly defined class or the AF41 class for LGS (instead of using the EF class as in the example of FIG. 9B). The example of FIG. 10 is similar to that of FIG. 9B except that instead of applying ingress shaper 1142 to LGS packets from LGS marker 1134, here, LGS packets may be mapped to AF41 class so that ingress shaper 1142 is applied to LGS packets from LGS marker 1135 (e.g. according to class rate and rules from Ingress Shaper DB 1073). Some LGS packets (green packets) may be sent directly to joiner 1144. Some packets (yellow and red packets) may be sent to lower level markers (e.g. AF31 marker 1136) for re-marking and then sent to joiner 1144. EF packets bypass ingress shaper 1142 in this example.

In egress shaper module 1148, EF packets bypass egress shaper 1151 and go through EF queue 1152 to first priority scheduler 1160 while LGS packets go to egress shaper 1151 which sends them to different queues accordingly (e.g. according to class rate and rules from Egress shaper DB 1074). Some LGS packets (green packets) are sent to LGS queue 1153 while other packets (yellow and red packets) are sent to lower level queues (e.g. AF3x queue 1154 or AF2x queue 1155). Packets from LGS queue 1153 are sent to second priority scheduler 1161. Packets from queues 1153-1157 are managed by WRR scheduler 1162 (e.g. according to appropriate WRR algorithm) and sent to second priority scheduler 1161, which schedules packets according to priority (e.g. LGS packets sent first) and then sent to priority scheduler 1160, which schedules packets according to priority (e.g. EF packets sent first).

While the examples illustrated in FIGS. 9B-10 refer to networked device 1040 acting as an ingress router for network 100 and performing classification functions, other components of network 100 may use the classifications applied (DSCP values) to determine appropriate handling for different data packets (e.g. prioritizing certain data packets). For example, routers 130, 140 (and any other routers) and device 120 may be configured by in-band signaling (e.g. as illustrated in one or more of FIGS. 2-7) to handle data packets of different classes differently to meet different class based QoS requirements. This may be achieved by appropriate traffic shapers (ingress shapers and/or egress shapers) in routers and/or other components. Such traffic shapers (configured according to requirements received by in-band signaling and stored in one or more databases) may use a TCM scheme or other traffic shaping algorithm to prioritize data packets appropriately at every component along a data path through a network.

Figure 11:
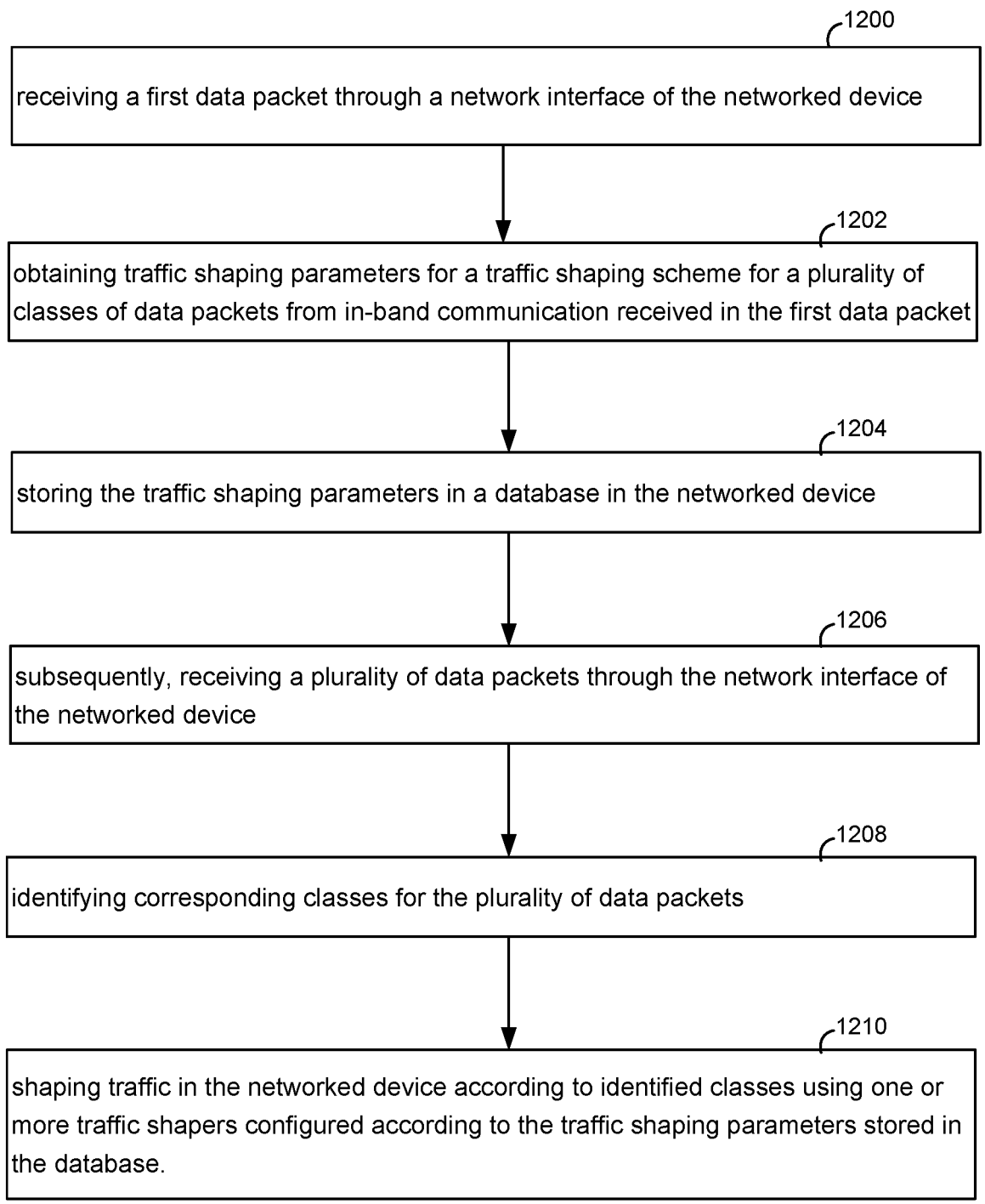
FIG. 11 illustrates an example of a method according to an embodiment of the disclosure.

FIG. 11 illustrates an example of a method of operating a networked device. The method includes receiving a first data packet through a network interface of the networked device 1200 obtaining traffic shaping parameters for a traffic shaping scheme for a plurality of classes of data packets from in-band communication received in the first data packet 1202 and storing the traffic shaping parameters in a database in the networked device 1204. The method further includes subsequently, receiving a plurality of data packets through the network interface of the networked device 1206, identifying corresponding classes for the plurality of data packets 1208, and shaping traffic in the networked device according to identified classes using one or more traffic shapers configured according to the traffic shaping parameters stored in the database 1210.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a network interface for connection to a network;
a database configured to store traffic shaping parameters for a traffic shaping scheme for a plurality of classes of data packets received by the network interface, the plurality of classes includes at least one of a Latency Guaranteed Service (LGS) class having an LGS Digital Services Code Point (DSCP) or a Bandwidth Guaranteed Service (BGS) class having a BGS DSCP;
a database loading circuit configured to obtain the traffic shaping parameters from in-band communication received in a data packet by the network interface and load the traffic shaping parameters into the database; and one or more traffic shapers configured to access the traffic shaping parameters in the database and apply the traffic shaping scheme according to the traffic shaping parameters to the plurality of classes of data packets received by the network interface including placing data packets of the LGS class in a highest priority queue or a second highest priority queue.

2. The apparatus of claim 1, wherein the one or more traffic shapers include an egress shaper configured to send data packets of a class to a plurality of queues associated with the plurality of classes of data packets.

3. The apparatus of claim 2 wherein the plurality of queues includes two or more queues managed by a weighted fair queueing scheduler and at least one priority queue managed by a priority scheduler.

4. The apparatus of claim 1, wherein the one or more traffic shapers include an ingress shaper configured to direct data packets marked for a first class to be re-marked for one or more other classes.

5. The apparatus of claim 1, wherein the traffic shaping scheme is a single rate Three Color Marker (srTCM) scheme directed to the plurality of classes of data packets.

6. The apparatus of claim 1, wherein the traffic shaping scheme is a two rate Three Color Marker (trTCM) scheme.

7. The apparatus of claim 1, wherein the traffic shaping scheme is a leaky bucket scheme.

8. The apparatus of claim 1, wherein a traffic shaper is configured to re-mark packets belonging to a first class as belonging to a second class or to place packets belonging to the first class in a queue of at least the second class.

9. A method of operating a networked device comprising:
receiving a first data packet through a network interface of the networked device;
obtaining traffic shaping parameters for a traffic shaping scheme for a plurality of classes of data packets from in-band communication received in the first data packet, the plurality of classes includes at least one of a Latency Guaranteed Service (LGS) class having an LGS Digital Services Code Point (DSCP) or a Bandwidth Guaranteed Service (BGS) class having a BGS DSCP;
storing the traffic shaping parameters in a database in the networked device;
subsequently, receiving a plurality of data packets through the network interface of the networked device;
identifying corresponding classes for the plurality of data packets; and
shaping traffic in the networked device according to identified classes using one or more traffic shapers configured according to the traffic shaping parameters stored in the database including placing data packets of the LGS class in a highest priority queue or a second highest priority queue.

10. The method of claim 9, wherein shaping traffic in the networked device includes sending data packets of a class to a plurality of queues associated with the plurality of classes of data packets.

11. The method of claim 10, wherein the method further includes selecting data packets from the plurality of queues that are managed by a weighted fair queuing scheduling scheme and strict priority scheduling scheme.

12. The method of claim 9, wherein shaping traffic in the networked device includes re-marking packets marked as belonging to a first class as belonging to at least a second class.

13. The method of claim 9, further comprising placing data packets of the BGS class in one or more queues of lower priority than any queue containing data packets of the LGS class.

14. The method of claim 13, further comprising placing data packets of additional classes into the one or more queues of lower priority.

15. The method of claim 14, wherein obtaining traffic shaping parameters includes reading a hop-by-hop extension header of an IPV6 data packet.

16. A system comprising:
a plurality of networked devices coupled to a network, each of the plurality of networked devices including:
a network interface for connection to the network;
a database configured to store traffic shaping parameters for a traffic shaping scheme for a plurality of classes of data packets received by the network interface, the plurality of classes includes at least one of a Latency Guaranteed Service (LGS) class having an LGS Digital Services Code Point (DSCP) or a Bandwidth Guaranteed Service (BGS) class having a BGS DSCP;
a database loading circuit configured to obtain the traffic shaping parameters from in-band communication received in a data packet by the network interface; and
one or more traffic shapers configured to access the traffic shaping parameters in the database and apply the traffic shaping scheme according to the traffic shaping parameters to the plurality of classes of data packets received by the network interface including placing data packets of the LGS class in a highest priority queue or a second highest priority queue.

17. The system of claim 16, wherein the one or more traffic shapers include an egress shaper configured to send data packets of a class to a plurality of queues associated with the plurality of classes of data packets.

18. The system of claim 16, wherein a traffic shaper is configured to re-mark packets belonging to a first class as belonging to a second class or to place packets belonging to the first class in a queue of at least the second class.

19. The system of claim 16, wherein the in-band communication is in a hop-by-hop extension header of an IPV6 data packet.

* * * * *

UNITED STATES PATENT AND TRADEMARK OFFICE
CERTIFICATE OF CORRECTION

PATENT NO. : 12,096,276 B2
APPLICATION NO. : 17/585884
DATED : September 17, 2024
INVENTOR(S) : Han et al.

It is certified that error appears in the above-identified patent and that said Letters Patent is hereby corrected as shown below:

In the Claims

Column 30, Line 22 Claim 15, please change "IPV6" to -- IPv6 --
Column 30, Line 54 Claim 19, please change "IPV6" to -- IPv6 --

Signed and Sealed this
Twelfth Day of November, 2024

Katherine Kelly Vidal
*Director of the United States Patent and Trademark Office*